United States Patent
Pecha et al.

(10) Patent No.: US 12,522,536 B2
(45) Date of Patent: Jan. 13, 2026

(54) CEMENTITIOUS BIOCHAR COMPOSITIONS AND METHODS OF MAKING THE SAME

(71) Applicants: Alliance for Energy Innovation, LLC, Golden, CO (US); Colorado School of Mines, Golden, CO (US)

(72) Inventors: Michael Brennan Pecha, Littleton, CO (US); Lori Elizabeth Tunstall, Golden, CO (US); Julia Hylton, Golden, CO (US)

(73) Assignees: Alliance for Energy Innovation, LLC, Golden, CO (US); Colorado School of Mines, Golden, CO (US)

( * ) Notice: Subject to any disclaimer, the term of this patent is extended or adjusted under 35 U.S.C. 154(b) by 527 days.

(21) Appl. No.: 17/698,569

(22) Filed: Mar. 18, 2022

(65) Prior Publication Data

US 2022/0298073 A1     Sep. 22, 2022

Related U.S. Application Data

(60) Provisional application No. 63/162,720, filed on Mar. 18, 2021.

(51) Int. Cl.
| | |
|---|---|
| *C04B 14/06* | (2006.01) |
| *C04B 18/06* | (2006.01) |
| *C04B 28/04* | (2006.01) |
| C04B 103/00 | (2006.01) |
| C04B 103/32 | (2006.01) |

(52) U.S. Cl.
CPC ............ *C04B 18/068* (2013.01); *C04B 14/06* (2013.01); *C04B 28/04* (2013.01); C04B 2103/0039 (2013.01); C04B 2103/32 (2013.01); C04B 2201/50 (2013.01)

(58) Field of Classification Search
CPC ....... C04B 18/068; C04B 14/06; C04B 28/04; C04B 2103/0039; C04B 2103/32; C04B 2201/50; C04B 14/022; C04B 18/167; C04B 1/101; Y02W 30/91
See application file for complete search history.

(56) References Cited

U.S. PATENT DOCUMENTS

| | | | | |
|---|---|---|---|---|
| 2019/0337861 | A1* | 11/2019 | Luthe | ...................... C04B 38/10 |
| 2020/0062646 | A1* | 2/2020 | Ng | .......................... E04C 2/044 |

OTHER PUBLICATIONS

Ippolito et al. Feedstock choice, pyrolysis temperature and type influence biochar characteristics: a comprehensive meta-data analysis review. Biochar. 2, 421-438. (Year: 2020).*

Gupta et al. Application of biochar from food and wood waste as green admixture for cement mortar, Science of the Total Environment, 619-620, 2017, pp. 419-435 (Year: 2017).*

Chen et al., "Sludge biochar as a green additive in cement-based composites: Mechanical properties and hydration kinetics", Construction and Building Materials, 2020, vol. 262, Article No. 120723, pp. 1-15.

(Continued)

*Primary Examiner* — Amber R Orlando
*Assistant Examiner* — Anastasia A. Kuvayskaya
(74) *Attorney, Agent, or Firm* — Michael A. McIntyre

(57) ABSTRACT

Described herein are cementitious compositions comprising biochar and methods of making such compositions. The compositions find use in a variety of applications, including use in a variety of building materials and building applications.

17 Claims, 11 Drawing Sheets

(56) References Cited

OTHER PUBLICATIONS

Choi et al., "Mechanical Properties of Mortar Containing Bio-Char From Pyrolysis", Journal of the Korea Institute For Structural Maintenance Inspection, May 2012, vol. 16, No. 3, pp. 67-74.

Cosentino et al., Type of materials, pyrolysis conditions, carbon content and size dimensions: The parameters that Influence the mechanical properties of biochar cement-based composites, Theoretical and Applied Fracture Mechanic, 2019, vol. 103, pp. 1-10.

Dixit et al., "Cement Replacement and Improved Hydration in Ultra-High Performance Concrete Using Biochar", 3rd International Conference on the Application of Superabsorbent Polymers (SAP) and Other New Admixtures Towards Smart Concrete, Eds. by W.P Boshoff et al., 2020, pp. 222-229.

Dutta et al., "Ex Situ Catalytic Fast Pyrolysis of Lignocellulosic Biomass to Hydrocarbon Fuels: 2019 State of Technology and Future Research", National Renewable Energy Laboratory Technical Paper NREL/TP-5100-76269, Mar. 2020, 44 pages.

Gao et al., "Assessment of a detailed biomass pyrolysis kinetic scheme in multiscale simulations of a single-particle byrolyzer and a pilot-scale entrained flow pyrolyzer", Chemical Engineering Journal, 2021, vol. 418, Article No. 129347, pp. 1-12.

Gupta et al., "Autonomous healing in concrete by bio-based healing agents—A review", Construction and Building Materials, Aug. 2017, vol. 146, pp. 419-428.

Gupta et al., "Use of biochar as carbon sequestering additive in cement mortar", Cement and Concrete Composites, 2018, vol. 87, pp. 110-129.

Gupta et al., "Carbonaceous micro-filler for cement: Effect of particle size and dosage of biochar on fresh and hardened properties of cement mortar", Science of The Total Environment, Apr. 2019, vol. 662, pp. 952-962.

Garcia-Perez et al., "Biochar Production in Biomass Power Plants: Techno-Economic and Supply Chain Analyses", A report for The Waste to Fuels Technology Partnership 2017-2019 Biennium: Advancing Organics Management in Washington State, Department of Ecology State of Washington, Sep. 2019, pp. 1-20.

Ippolito et al., "Feedstock choice, pyrolysis temperature and type influence biochar characteristics: acomprehensive meta-data analysis review", Biochar, 2020, vol. 2, pp. 421-438.

Liang et al., "Utilization of CO2 curing to enhance the properties of recycled aggregate and prepared concrete", Cement and Concrete Composites, Jan. 2020, vol. 105, Article No. 103446, pp. 1-14.

Makul, "Combined use of untreated-waste rice husk ash and foundry sand waste in high-performance self-consolidating concrete", Results in Materials, Aug. 2019, vol. 1, No. 100014, pp. 1-11.

Nair et al., "Biochar Amended Concrete for Carbon Sequestration", IOP Conferences Series: Materials Sciences and Engineering, 2020, vol. 936, pp. 1-6.

Pecha et al., "Pyrolysis of lignocellulosic biomass: oil, char, and gas", Bioenergy (Second Edition) Biomass to Biofuels and Waste to Energy, 2020, Chapter 29, pp. 581-619.

Restuccia et al., "Promising low cost carbon-based materials to improve strength and toughness in cement composites", Construction and Building Materials, Nov. 2016, vol. 126, pp. 1034-1043.

Rodin II et al., "Recycled glass fiber reinforced polymer composites incorporated in mortar for improved mechanical performance", Construction and Building Materials, Oct. 2018, vol. 187, pp. 738-751.

Spaeth et al., "Improvement of recycled concrete aggregate properties by polymer treatments", International Journal of Sustainable Built Environment, Dec. 2013, vol. 2, No. 2, pp. 143-152.

Suarez-Riera et al., "The use of Biochar to reduce the carbon footprint of cement-based materials", Procedia Structural Integrity, 2020, vol. 26, pp. 199-210.

Tan et al., "Properties of cement mortar containing pulverized biochar pyrolyzed at different temperatures", Construction and Building Materials, 2020, vol. 263, Article No. 120616, pp. 1-11.

Thomas et al., "Modelling chloride diffusion in concrete: effect of fly ash and slag", Cement and Concrete Research, Apr. 1999, vol. 29, No. 4, pp. 487-495.

Tunstall et al., "A new hypothesis for air loss in cement systems containing fly ash", Cement and Concrete Research, Apr. 2021, vol. 142, Article No. 106352, pp. 1-18.

Twidale, "Analysts raise EU carbon price forecasts after bull run", ESG Environment, Jan. 18, 2021, available at https://www.reuters.com/article/us-eu-carbon-poll/analysts-raise-eu-carbon-price-forecasts-after-bull-runidUSKBN29N0ZJ, accessed Jun. 13, 2022, pages.

Wang et al., "Biochar as green additives in cement-based composites with carbondioxide curing", Journal of Cleaner Production, 2020, vol. 258, Article No. 120678, pp. 1-8.

Weisberg et al., "Carbon Market Investment Criteria for Biochar Projects", Public Interest Energy Research (PIER) Program—Final Project Report—The Climate Trust CEC-500-02-004, Sep. 2010, available at chrome- extension://efaidnbmnnnibpcajpcglclefindmkaj/ https://www.biochar-international.org/wp-content/uploads/2018/04/WestCARB-Biochar-Report-Final.pdf, 44 pages.

Zhao et al., "Utilizing bio-char as a bio-modifier for asphalt cement: A sustainable application of bio-fuel by-product", Fuel, 2014, vol. 133, pp. 52-62.

* cited by examiner

CEMENTITIOUS BIOCHAR COMPOSITIONS AND METHODS OF MAKING THE SAME

CROSS REFERENCE TO RELATED APPLICATIONS

This application claims priority and the benefit under 35 U.S.C. § 119(e) to U.S. Provisional Patent Application No. 63/162,720, filed on Mar. 18, 2021, which is incorporated by reference in its entirety.

GOVERNMENT LICENSE RIGHTS

The United States Government has rights in this invention under Contract No. DE-AC36-08GO28308 between the United States Department of Energy and Alliance for Sustainable Energy, LLC, the Manager and Operator of the National Renewable Energy Laboratory.

FIELD

The disclosure generally relates to compositions, methods, and systems for cementitious compositions containing biochar and aggregate.

BACKGROUND

Concrete is a composite material of a binding medium, typically hydraulic cement and water, having particles or fragments of aggregate embedded therein and is the most utilized building material in world. Worldwide, 30 billion tons of concrete are used each year with the demand steadily growing. Global production and applications of concrete are estimated to consume more than 10 exa-joules of energy and release 2.2 gigatons of $CO_2$ into the atmosphere, accounting for about 8% of the world's greenhouse gas emissions. The $CO_2$ emissions are primarily due to the cement component in concrete. The process for manufacturing concrete is highly energy intensive and emits large amounts of greenhouse gases as a by-product. The energy required for this process is about 4 gigajoules per ton of cement produced. Carbon dioxide emissions occur from both primary and secondary sources, from the production process itself (calcination) and from the energy required to run the production process (combustion). The associated carbon dioxide emissions are about 900 kg $CO_2$ per ton of cement produced. Thus, there remains a substantial need for new concrete formulations and methods of manufacture that can significantly decrease the impact of concrete production and use on the global environment.

SUMMARY

An aspect of the disclosure relates to a free-flowing particulate cementitious composition that includes a hydraulic cement, at least about 2% of a particulate biochar by weight based on a total amount of the hydraulic cement and the biochar, and an aggregate material. The particulate biochar may have a mean particle size $(D_{v,50})$ of about 0.1 µm—about 100 µm and an average surface area of at least about 20 $m^2/g$.

Another aspect of the disclosure relates to a wet cementitious composition that includes a hydraulic cement, at least about 2% of a particulate biochar by weight based on a total amount of the hydraulic cement and the biochar, an aggregate material, and water. The particulate biochar may have a mean particle size $(D_{v,50})$ of about 0.1 µm—about 100 µm and an average surface area of at least about 20 $m^2/g$. The cementitious composition may have a water to cement ratio between 0.3 and 0.65 and a slump between 100 mm and 150 mm.

Yet another aspect of the disclosure relates to a solid cementitious composition that includes a hydraulic cement, at least about 2% of a particulate biochar by weight based on a total amount of the hydraulic cement and the biochar, and an aggregate material. The particulate biochar may have a mean particle size $(D_{v,50})$ of about 0.1 µm—about 100 µm and an average surface area of at least about 20 $m^2/g$. The solid cementitious composition may have a compressive strength of at least about 5 MPa, of at least about 20 MPa, of at least about 40 MPa. The compressive strength may be at least about 60 MPa, at least about 80 MPa, or even at least about 100 MPa.

Yet another aspect of the disclosure relates to a method of preparing a cementitious composition, including the steps of: combining a hydraulic cement, at least about 2% of a biochar by weight based on a total amount of the hydraulic cement and the biochar, and an aggregate material; and adding water in an amount sufficient to obtain a water to cement ratio (w/c) of between 0.3 and 0.65. The particulate biochar may have a mean particle size $(D_{v,50})$ of about 0.1 µm—about 100 µm and an average surface area of at least about 20 $m^2/g$. In some embodiments the method further comprises: pouring the composition into a mold; and curing the composition to form a cementitious structure. The cured solid cementitious composition may have a compressive strength of at least about 5 MPa, of at least about 20 MPa, of at least about 40 MPa. The compressive strength may be at least about 60 MPa, at least about 80 MPa, or even at least about 100 MPa.

In any of these aspects, the cementitious composition may have at least about 5% biochar by weight, at least about 10% biochar by weight, at least about 15% biochar by weight, or at least about 20% biochar by weight based on the total amount of the hydraulic cement and biochar.

In any of these aspects, the biochar may have one or more of a mean particle size $(D_{v,50})$ of about 1-about 30 µm, an average surface area of at least about 100 $m^2/g$, an ash content of at least about 2 wt % and no more than about 30 wt % based on the weight of the biochar, and a water holding capacity of at least about 3 wt % and no more than about 15 wt % based on the weight of the biochar.

In any of these aspects, the biochar may be formed from a woody biomass under fast pyrolysis. The woody biomass may be pine, poplar, or combinations thereof.

In any of the embodiments, the hydraulic cement may be a Portland cement, typically ASTM C150 Standard Portland Cement.

In any of these aspects, the aggregate material may comprise sand, and may further include a coarse aggregate selected from crushed rock, gravel, recycled concrete, or combinations thereof.

In any of these aspects, the cementitious composition may further comprise a superplasticizer. The superplasticizer may be sulfonated melamine formaldehyde, a sulfonated naphthalene formaldehyde condensate, an acetone sulfonate formaldehyde condensate, a sulfamate formaldehyde condensate, a lignosulfonate, a polycarboxylate, or combinations thereof.

FIGURES

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

Figure 8:
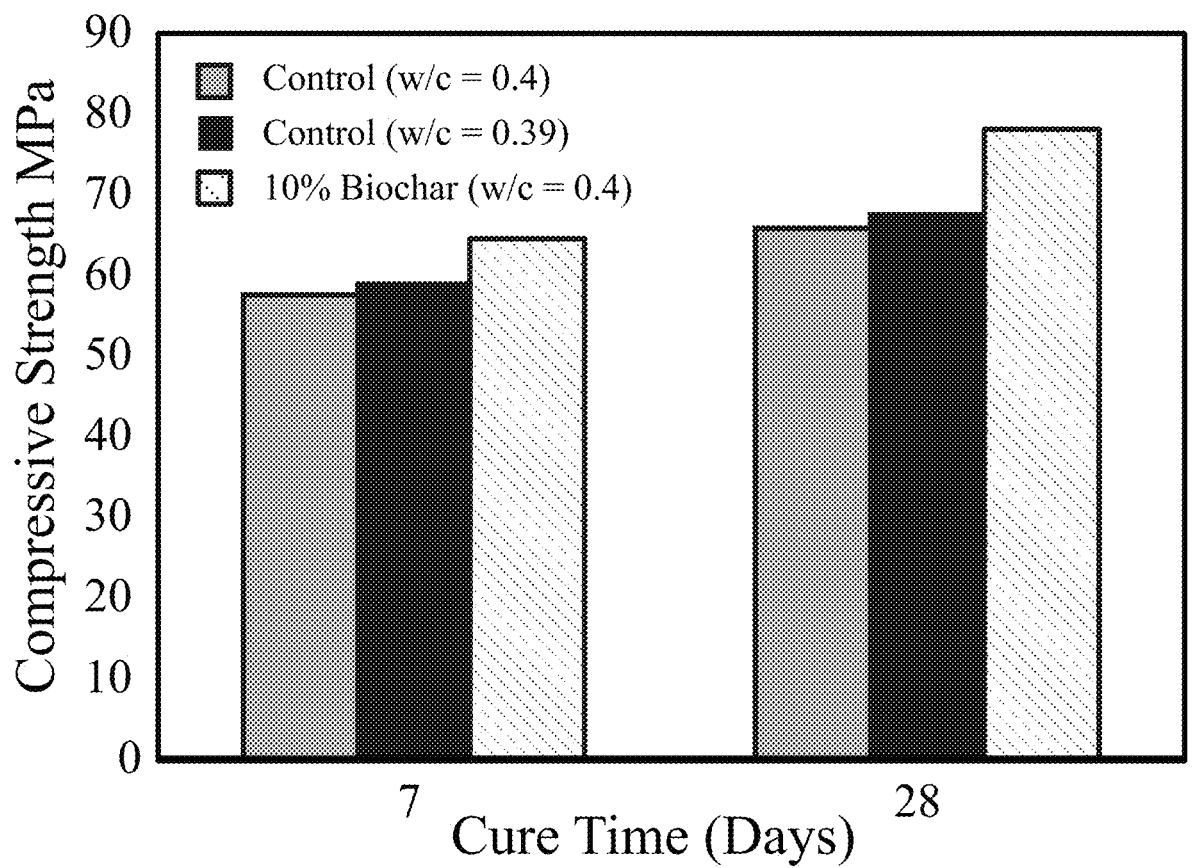

FIG. 8 illustrates the 7-day and 28-day compressive strength of a 10% biochar mortar sample having a w/c ratio (defined herein) of 0.4 (white striped) and two control mortar samples having a w/c ratio of 0.4 (grey) and 0.39 (black).

Figure 9:
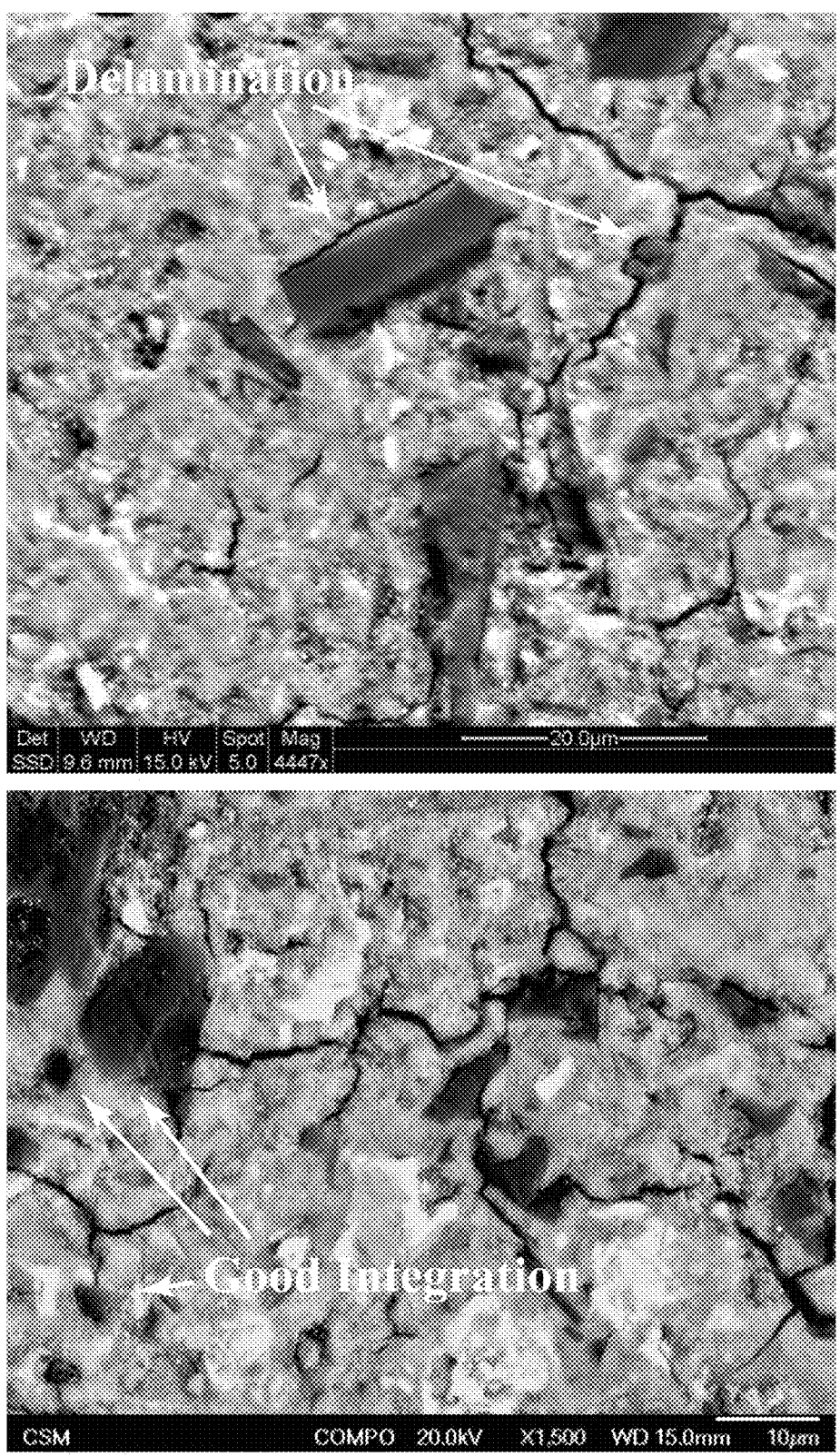

FIG. 9 illustrates two scanning electron micrographs (SEM) of 10% biochar mortars prepared according to the methods provided by the present disclosure. The black particles are biochar. While most of the biochar appears to be well integrated into the cement matrix, some show delamination, as seen in the top image.

Figure 10:
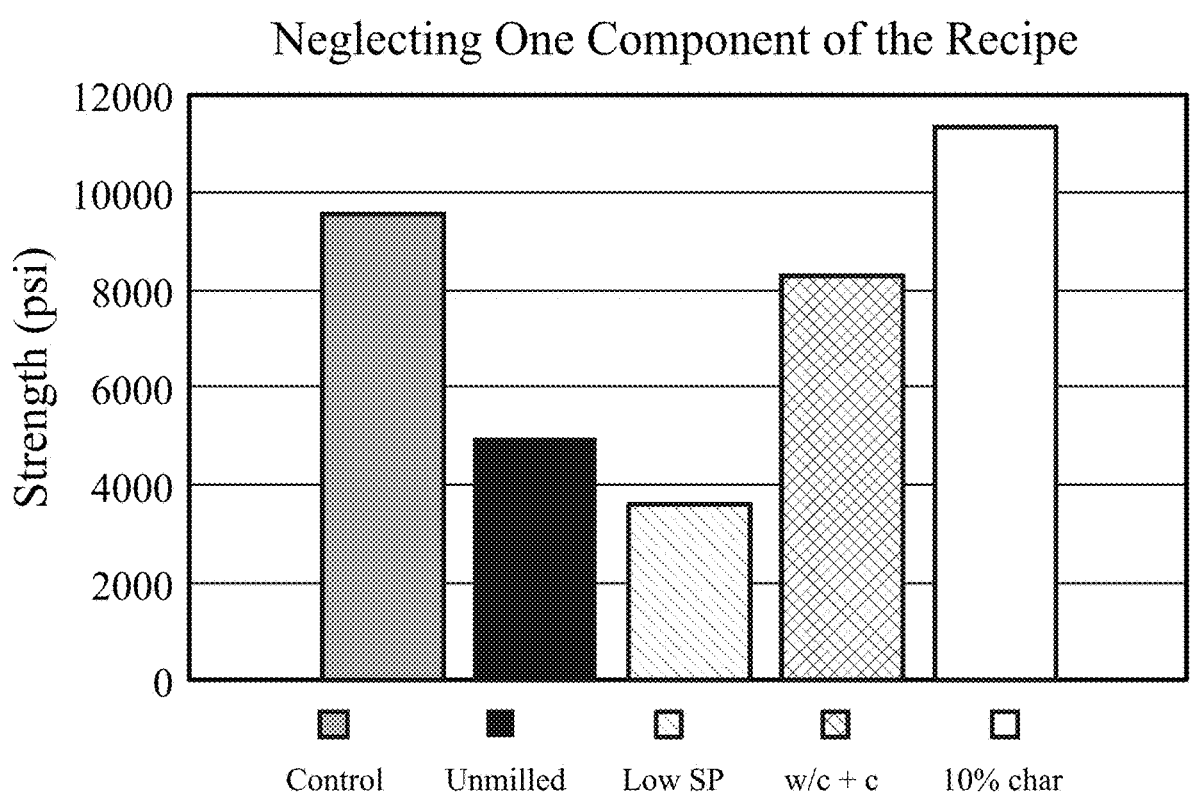

FIG. 10 illustrates the compressive strength of various 10% biochar mortar samples compared to a control mortar sample (grey). The black bar (unmilled) corresponds to a mortar sample prepared with unmilled biochar; the white striped bar (Low SP) corresponds to a mortar mix prepared using the same superplasticizer dosage used for the control sample; the white cross hatched bar (w/c+c) corresponds to a mortar mix prepared by treating the biochar as part of the cement component, effectively increasing the w/c; the white bar (10% char) corresponds to the 10% biochar mortar mix of Example 2.

Figure 11:
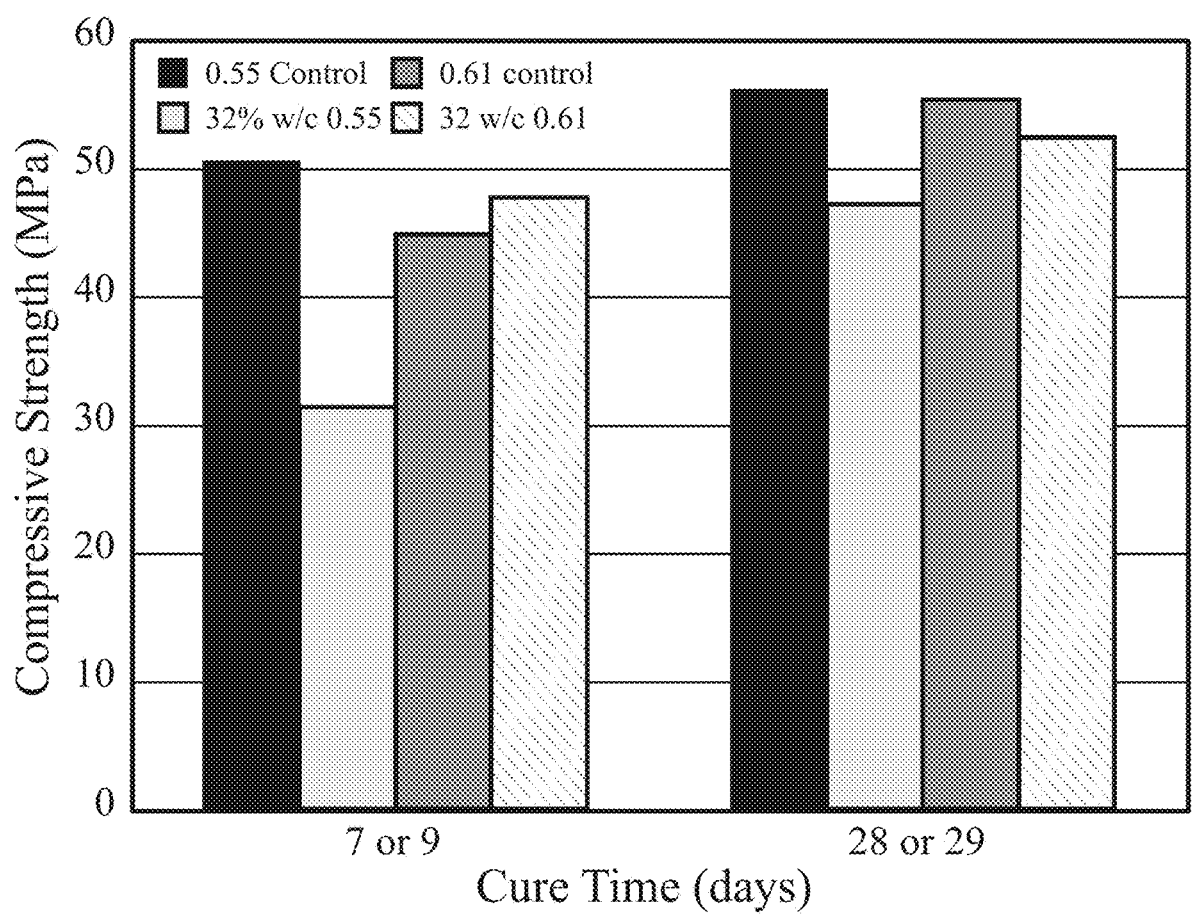

FIG. 11 illustrates compressive strength at 7 or 9 days and 28 or 29 days aging time for 32% biochar mortar samples mixtures and control mortar samples with a w/c ratio of 0.55 and 0.61.

DETAILED DESCRIPTION

Definitions

As used herein, an "air detainer" or "defoamers" which may be used interchangeably herein, refers to a class of compounds and/or additives that are added to concrete to eliminate foaming and minimize air entrainment in cement slurries, grouts, concrete and mortars. Air detrainers can also be used to counteract the air entrainment caused by water reducers and super plasticizers.

As used herein, an "air entrainer" refers to a class of compounds and/or additives that are added to concrete to facilitate the development of a system of microscopic air bubbles within concrete during mixing. Air entrainers increase the freeze-thaw durability of concrete, increase resistance to scaling caused by deicing chemicals, and improve workability.

As used herein, a "binder", "binding material", or a "binding agent", which may be used interchangeably herein refers to a material that holds or draws other materials together to form a cohesive whole mechanically and/or chemically, by adhesion or cohesion.

As used herein, "biochar replacement level" or "% biochar," which may be used interchangeably, refers to the amount of cement replaced by biochar. The biochar replacement level is the mass of biochar divided by the total mass of cement and biochar.

As used herein, "biomass" refers to a variety of plants and plant materials, such as, but not limited to, wood and wood-related materials, for example lumber, saw dust, particle board, leaves, trees, and the like. In some embodiments, of the present disclosure, biomass is selected from the group including, but not limited to, herbaceous material, agricultural residues, forestry residues, municipal solid wastes, wastepaper, pulp and paper mill residues, and combinations thereof. In some embodiments of the present disclosure, biomass is a non-wood material. In some embodiments of the present disclosure, biomass is from a biofuel crop (i.e., a crop grown for use in producing a biofuel, such as bioethanol). In some embodiments of the present disclosure, biomass is a grass, for example switchgrass, grass clippings, rice hulls, bagasse (e.g., sugar cane bagasse), jute, hemp, flax, bamboo, miscanthus, sorghum residue, sisal, abaca, hay, straw, corn cobs, corn stover, whole plant corn, coconut hair, and combinations thereof.

As used herein, "cement" refers an inorganic material or a mixture of inorganic materials that set, hardens, and adheres to other materials to bind them together.

As defined herein, "cementitious material," "cementitious mixture," or "cementitious composition," which may be used interchangeably herein, refers to a composition that comprises cement such as a mortar or a concrete and the free flowing particulate mixes that are hydrated to form the mortar or concrete. Thus, a cementitious material may refer to a free flowing particulate mixture, a liquid mixture, or a cured solid mixture.

As used herein, "compressive strength" refers to the maximum compressive stress that, under an applied load, a given solid material, for example concrete, can sustain without failure or collapse. In various aspects, the compressive strength of hydraulic cement mortars is determined according to standards set by one or more international standards setting organizations, such as the American Society for Testing and Materials, International (ASTM) (West Conshohocken, PA). In some embodiments of the present disclosure, the compressive strength is determined by ASTM C109—"Standard Test Method for Compressive Strength of Hydraulic Cement Mortars" (e.g., ASTM-C109~2020B Edition, a/k/a ASTM C109-20B).

As defined herein, a "concrete", is a composite material comprising cement and fine and coarse aggregates bonded together with a fluid cement that hardens over time. Concrete may be used to refer to a wet mixture or a cured mixture.

As used herein, "flexural strength" refers to the maximum bending stress that can be applied to that material before it yields (i.e., before it fractures). In some embodiments of the present disclosure, the flexural strength of hydraulic cement mortars is determined by ASTM C348—"Standard Test Method for Flexural Strength of Hydraulic-Cement Mortars" (e.g., ASTM-C348—2021 Edition, a/k/a ASTM C348-21).

As used herein, "flow" refers to the overall workability and/or consistency of a concrete or mortar (i.e., how easily a freshly prepared mixture can be mixed, placed, consolidated, and finished with minimal loss of homogeneity). The flow of concrete may be measured by using a slump test which measures the distance from the top of slumped concrete, formed by filling a slump cone with concrete then removing the slump cone, to the level of the top of the slump cone. In some embodiments of the present disclosure, the flow of concrete is determined by ASTM-C143—"Standard Test Method for Slump of Hydraulic-Cement Concrete" (e.g ASTM C 143 or AASHTO T 119). The flow of a mortar may be measured as the percent increase in the average diameter of the spread of the mortar over the base diameter of a mold. In some embodiments of the present disclosure, the flow of a mortar is determined by ASTM C1437— "Standard Test Method for Flow of Hydraulic Cement Mortar" (e.g., ASTM-C1437-2020 Edition, a/k/a ASTM C1437-20). In various aspects, the flow of a mortar is expressed as a percent between 0-150%, which is the percentage increase of the original test diameter.

As used herein, "hydraulic cement" refers to an inorganic material or a mixture of inorganic materials that sets and develops strength by chemical reaction with water through the formation of hydrates. Examples of hydraulic cements are Portland cement, slag cement, and blended cement, among others.

As defined herein, a "mortar" refers to a workable paste which hardens and comprises cement and a fine aggregate material, for example sand and/or other fine aggregates. Mortar may be used to refer to a wet mixture or a cured mixture.

As used herein, "particle size" refers to the median particle size (D50), unless otherwise specified, which may be determined by sieving according to ASTM D2862—"Standard Test Method for Particle Size Distribution of Granular Activated Carbon" (e.g., ASTM-D2862—2017 Edition, a/k/a ASTM D2862-16) or other methods. The D50 is the maximum particle diameter below which 50% of the sample volume exists. The D90 is the maximum particle diameter below which 90% of the sample volume exists. The D10 is the maximum particle diameter below which 10% of the sample volume exists.

As used herein, "pore volume" refers to void volume due the presence of pores, expressed in cubic centimeters per gram ($cm^3/g$). The pore volume may be measured using gas adsorption techniques (e.g., $CO_2$ adsorption, Brunauer-Emmett-Teller (BET) surface area analysis, and the like) using instruments such as a TriStar II Surface Area Analyzer (Micromeritics Instruments Corporation, Norcross, Ga., USA).

As used herein, "pore-size distribution" is the relative abundance of each pore size in a representative volume. It can be represented with a function $f(r)$, which has a value proportional to the combined volume of all pores whose effective radius is within an infinitesimal range centered on r.

As used herein, "Portland cement" refers to a type of hydraulic cement containing primarily calcium silicates. Portland cement is in the form of a finely ground powder that is manufactured by burning and grinding a mixture of limestone and clay or shale. It has high CaO content (~63%), and lower amounts of $SiO_2$ (~20%) and $Al_2O_3$ (~6%). In some embodiments of the present disclosure, Portland cement conforms to ASTM C150—"Standard Specification for Portland Cement" (e.g., ASTM-C150~2021 Edition, a/k/a ASTM C150/C150M-21).

As used herein, "pozzolans" or "pozzolanic materials," which may be used interchangeably, refers to a class of siliceous or siliceous and aluminous materials that, on their own, possess little or no cementitious value but will, in finely divided form and in the presence of moisture, chemically react with calcium hydroxide (lime) at ordinary temperatures to form compounds having cementitious properties (e.g., calcium silicate hydrate).

As used herein, "pozzolanic activity" refers to ability of a pozzolan to react with calcium hydroxide. The pozzolanic activity is a measure of either the degree of reaction over time, or the reaction rate between a pozzolan and $Ca^{2+}$ or calcium hydroxide ($Ca(OH)_2$, or CH in cement chemistry notation) in the presence of water. The pozzolanic activity of a material may be determined using the Chapelle Test, for example as described in Chapelle J. *Attaque sulfocalcique des laitiers et pouzzolanes. Rev. Matér. Constr,* 1958, 512, 136-145.

As used herein, "pyrolysis" refers to the chemical decomposition of organic materials at elevated temperatures in a predominantly inert atmosphere (little to no oxygen or steam). Pyrolysis produces condensable liquids, non-condensable gases, and biochar. Pyrolysis processes are divided into different subgroups depending upon the operating conditions. In "slow pyrolysis," feedstock is slowly heated at a low heating rate (0.1-1° C./second) by using large particle sizes or piles of biomass (>1 cm) to temperatures of between 300-500° C. for a period of time ranging from minutes, hours, to even days. In "fast pyrolysis," feedstock is heated at a more rapid heating rate (between 1° C./second and 100° C./second) by using small particle sizes (<6 mm) to a temperature between 400-900° C. for a period of time of on the order of seconds to tens of seconds. In "flash pyrolysis," feedstock is very rapidly heated (>1000° C./second) by using very small particle sizes (<1 mm) or ablation reactors to a temperature between 400-900° C. for a period of time of less than one second.

As used herein, a "superplasticizer" refers to a class of compounds or additives capable of reducing the amount of mixing water of concrete required for a given workability by typically about 30%. Superplasticizers increase the flow of concrete and/or reduce the water to cement ratio required to reach a desired flow.

As used herein, "water to cement ratio" or "w/c" is the ratio of the weight of water to the weight of cement used in a cementitious mix. In the present disclosure, for the purposes of determining the w/c, the biochar is not included as part of the cement. In some embodiments of the present disclosure, the water in the w/c is the sum of the water and any water content of the biochar.

Reference will now be made in detail to particular embodiments of compositions and methods. The disclosed embodiments are not intended to be limiting of the claims.

This disclosure generally relates to reduced carbon footprint cementitious compositions comprising biochar and methods of making and using such compositions. Use of biochar as a cement replacer not only reduces the amount of cement in the composition but it also sequesters carbon within the cement matrix, reducing the emission of carbon into the atmosphere. Thus, the disclosed compositions, which comprise biochar cement replacers, meaningfully reduce the carbon footprint associated with concrete production.

This disclosure also relates to, among other things, biochar containing cementitious compositions that demonstrate improved mechanical properties, for example improved compressive strength, even at high cement replacement levels, when compared to incumbent cementitious compositions. The improved compressive strength, among other performance characteristics, may be attributed to the use of biochar particles having a higher surface area, controlled pore volume (i.e., water absorption capacity), an ash content, and/or combinations thereof. Without wishing to be bound by any particular theory, it is hypothesized that the particulate biochar used herein improves the strength of cementitious compositions via three mechanisms: 1) it serves as nucleation sites, uniformly dispersing the strength-producing hydration product; 2) it serves as an internal curing agent, densifying the cement matrix with a lower effective water to cement ratio (w/c); and 3) it acts as a supplementary cementitious material (a pozzolan) consuming $Ca(OH)_2$ (CH) to produce additional calcium silicate hydrate (C—S—H, where C=CaO, S=$SiO_2$, and H=$H_2O$ and the dashes indicate variable stoichiometry).

Aspects provided by the present disclosure relate to reduced carbon footprint cementitious compositions comprising biochar, a cement binder, an aggregate material, and optionally one or more additives; and methods of making these reduced carbon footprint cementitious compositions. By adding the disclosed biochar to cementitious compositions, one reduces the total amount of cement in the disclosed compositions. Doing so also reduces the amount of energy required to produce the disclosed compositions, as well as the amount of greenhouse gases emitted during production, thereby reducing the carbon footprint associated with the disclosed compositions. In some embodiments of the present disclosure, the cementitious composition is a free-flowing particulate mixture. The mixture may be packaged, stored, and/or transported, and then mixed with water prior to pouring into a desired form and curing to form a solid. In other embodiments, the cementitious composition is a wet mixture or a ready mixture. Ready mixtures are generally prepared at one site and transported to another site where the mixture is poured into the desired form and cured to form a solid. In yet other embodiments, the cementitious composition is a cured solid. As will be appreciated by one of skill in the art, the characteristics or properties of certain ingredients within the various cementitious compositions may vary depending upon whether the cementitious composition is a free-flowing particulate mixture, a wet mixture, or a cured solid. With this in mind, in some instances, certain characteristics or properties of the individual ingredients are described in terms of the pre-mixed ingredient, while in other instances certain characteristics or properties of the mixture are described.

Biochar

Biochar (or "char") is the carbonaceous material that remains after a biomass has been subjected to a thermal treatment process that leads to carbonization. In some embodiments of the present disclosure, biochar refers to pyrolyzed biomass. In some embodiments of the present disclosure, biochar is derived from a biomass material that is from a crop grown for the purpose of producing a biofuel; in that regard, in some embodiments of the present disclosure, biochar is a co-product of a bio-fuel production method.

Biochar is known for its high carbon content, existing in the form of aromatic compounds and arranged in an irregular manner and in complex forms. The physical and chemical composition of biochar can vary based on the heating rate and temperature of pyrolysis, the type of feedstock, the particle size of the feedstock, and other factors. The biochar present in the disclosed compositions is produced under conditions that increase the surface area and pore volume, and that provide compositional features that are beneficial when the biochar is used as a cement replacer.

The feedstock used to produce the biochar can vary. In some embodiments of the present disclosure, biochar can be produced from biomass waste materials to avoid creating competition for land with any other land use options, such as food production or conservation. Biomass waste materials include, but are not limited to: agricultural residues (e.g., barley straw, rice hull, corn stover, and bagasse), as well as food waste; papermill waste; forestry and logging waste; and animal manures. Other suitable biomass materials include, but are not limited to, energy crops such as switchgrass and sugar cane, bamboo, softwood (e.g., pine), and hardwood (e.g., poplar). In some embodiments of the present disclosure, the feedstock comprises a single biomass material, in other embodiments, the feedstock comprises a mixture of biomass materials. The feedstock material(s) may also be subjected to air-classification to isolate high inorganic content biomass fractions away from primary feedstock sources to reduce their ash content. The feedstock material(s) may also undergo size reduction to form pellets or granules. In some embodiments of the present disclosure, the feedstock material comprises air-classified forest residues selected from pine, poplar, or both pine and poplar.

In some embodiments of the present disclosure, the biochar used in the cementitious compositions disclosed herein is produced using a fast pyrolysis (FP) process. Generally speaking, in fast pyrolysis processes, feedstock is heated at a heating rate between 1° C./second and 100° C./second to a temperature between about 400° C. and about 900° C. for a period of time of on the order of seconds to tens of seconds by using particle sizes that are typically less than about 6 mm. In contrast, in slow pyrolysis processes feedstock is slowly heated at a low heating rate (between 0.1° C./second and 1° C./second) to temperatures of between about 300° C. and 500° C. for a period of time ranging from minutes, hours, to even days, by using particle sizes or piles of powder typically having a particle size of greater than about 0.6 mm, or more typically greater than about 1 cm. Fast and slow pyrolysis generate biochars with different characteristics, even when the biochar is produced from the same feedstock material(s). The differences may arise, in part, due to the rate of evolution volatile species during pyrolysis, resulting in different surface properties and porous biochars. Biochars produced via fast pyrolysis beneficially have a high surface area, high pore density, and an available ash content. Without wishing to be bound by any particular theory, it is hypothesized that biochar produced via slow pyrolysis form liquid-phase intermediates that trap the ash content of the composition, making it less available for reaction, and/or have a low surface area compared to fast pyrolysis biochars.

There are a number of commercial reactor designs for pyrolysis: entrained flow reactors (e.g., laminar flow reactors); fluidized bed reactors; circulating fluid bed reactors; vacuum pyrolizers; and ablative pyrolizers. In some embodiments of the present disclosure, the biochar is produced by fast pyrolysis in an entrained flow reactor or a fluidized bed reactor. Such reactors have large processing capabilities and demonstrate excellent interphase heat transfer.

The particle size of the biochar can vary. In some embodiments of the present disclosure, the biochar is subjected to milling or grinding to reduce the average particle size and reduce the microporosity of the biochar. In some embodiments of the present disclosure, the average particle size ($D_{v,50}$) of the biochar particles is between 0.1 μm and 100 μm, in some embodiments between 1 μm and 30 μm, and in some embodiments between 1 μm and 20 μm. In some embodiments of the present disclosure, the average particle size of the biochar particles is less than 100 μm, is less than 90 μm, is less than 80 μm, is less than 70 μm, is less than 60 μm, is less than 50 μm, is less than 45 μm, is less than 40 μm, is less than 35 μm, is less than 30 μm, less than 25 μm, less than 20 μm, less than 15 μm, or less than 10 μm. In embodiments, the average particle size of the biochar particles is about 100 μm, about 90 μm, about 80 μm, about 70 μm, about 60 μm, about 50 μm, about 45 μm, about 40 μm, about 35 μm, about 30 μm, about 25 μm, about 20 μm, about 19 μm, about 18 μm, about 17 μm, about 16 μm, about 15 μm, about 14 μm, about 13 μm, about 12 μm, about 11 μm, about 10 μm, about 9 μm, about 8 μm, about 7 μm, about 6 μm, about 5 μm, about 4 μm, about 3 μm, about 2 μm, about 1 μm, about 0.5 μm, about 0.1 μm, or any range within any two of these particle sizes. The present inventors have determined that if the particle size is too large, then the biochar retains its original (raw) pore structure but is brittle and the water uptake and release is slow. In some embodiments of the present disclosure, the biochar particles may further have a particle size span of about 10 μm, about 9 μm, about 8 μm, about 7 μm, about 6 μm, about 5 μm, about 4 μm, about 3 μm, about 2 μm, about 1 μm, or any range within any two of these spans.

In various aspects, the biochar particles have a high surface area which increases its efficacy at homogenizing the cement hydration product distribution. In some embodiments of the present disclosure, the biochar particles have a surface area between 1 $m^2/g$ and 3000 $m^2/g$, in some embodiments between 2 $m^2/g$ and 1500 $m^2/g$, and in some embodiments between 20 $m^2/g$ and 1000 $m^2/g$. In some embodiments of the present disclosure, the biochar has a surface area of at least 20 $m^2/g$, at least 50 $m^2/g$, at least 75 $m^2/g$, at least 100 $m^2/g$, at least 125 $m^2/g$, at least 150 $m^2/g$, at least 175 $m^2/g$, at least 200 $m^2/g$, at least 225 $m^2/g$, at least 250 $m^2/g$, at least 275 $m^2/g$, at least 300 $m^2/g$, at least 325 $m^2/g$, at least 350 $m^2/g$, at least 375 $m^2/g$, at least 400 $m^2/g$, at least 425 $m^2/g$, at least 450 $m^2/g$, at least 475 $m^2/g$, at least 500 $m^2/g$, at least 525 $m^2/g$, at least 550 $m^2/g$, at least 575 $m^2/g$, at least 600 $m^2/g$, at least 650 $m^2/g$, at least 700 $m^2/g$, at least 750 $m^2/g$, at least 800 $m^2/g$, at least 850 $m^2/g$, at least 900 $m^2/g$, at least 950 $m^2/g$, at least 1000 $m^2/g$, at least 1050 $m^2/g$, at least 1100 $m^2/g$, at least 1150 $m^2/g$, at least 1200 $m^2/g$, at least 1250 $m^2/g$, at least 1300 $m^2/g$, at least 1350 $m^2/g$, at least 1400 $m^2/g$, at least 1450 $m^2/g$, or at least 1500 $m^2/g$. During pyrolysis, biochar retains its macropore structure from the native biomass, and new micro-, meso-, and macro-porosity is formed, in part catalyzed by alkali and alkaline earth metals. Because of its porous nature, biochar can adsorb/absorb ambient water, resulting in an ambient water content. Milled biochar also adsorbs ambient water. In some embodiments of the present disclosure, the ambient water content is generally no more than 0-5 wt. % of the composition, which can be reduced by storing the biochar in humidity-regulated environment. In some embodiments of the present disclosure, the biochar can adsorb/absorb water in wet cementitious compositions, functioning as an internal curing agent. This initially reduces the water available for the cement hydration reaction, but then the biochar gradually releases water as water is consumed during cement hydration reactions, resulting in a more gradual hydration reaction. In some embodiments of the present disclosure, the biochar beneficially has a high water adsorption/holding capacity between 3% and 15%, or more typically between 5% and 10%. In some embodiments of the present disclosure, the biochar has a water adsorption/holding capacity of about 3%, about 4%, about 5%, about 6%, about 7%, about 8%, about 9%, about 10%, about 11%, about 12%, about 13%, about 14%, about 15%, or any range between any two of these percent water holding capacity. The water holding capacity may be measured by adsorption-desorption experiments.

In various aspects, the biochar has high pore volume and a well-controlled distribution of pores. The pore sizes can be categorized as micropores (width <2 nm), mesopores (width between 2 nm and 50 nm), or macropores (width >50 nm, generally in practice between 50 nm and 300 nm depending upon the type of measurement methods used which may not measure pore volumes greater than 300 nm), with the differences in the size of their width openings being a representation of the pore distance. In some embodiments, the total pore volume of the biochar is between 0.003 cc/g and 3 cc/g, in some embodiments between 0.001 cc/g to 1 cc/g, or in some embodiments between 0.01 cc/g to 0.5 cc/g.

In general, the biochar composition may resemble that of the feedstock. For example, elements present in the feedstock material may be retained in the biochar and can include calcium, copper, iron, potassium, magnesium, nickel, phosphorous, sulfur, titanium, aluminum, zinc, silica, and combinations thereof. These elements may be present as oxides (e.g., $SiO_2$, $Al_2O_3$, $TiO_2$, $Fe_2O_3$, CaO, MgO, $Na_2O$, $K_2O$, $P_2O_5$, $SO_3$, $CO_2$, etc.) which collectively form an ash component. The biochar may also comprise surface functional groups, such as acid groups (e.g., carboxyl(pKa between 1.7 and 4.7), phosphonates (pKa between 6.1 and 6.8), lactones or lactols (pKa between 6.37 and 10.25), phenolic hydroxyls (pKa between 9.5 and 13), polyaromatic ring structures, or combinations thereof. The O/C and the H/C ratios of the biochar scale inversely with the pyrolysis temperature. At higher temperatures, the carbon content of the biochar increases, and the O/C and H/C ratios decrease. In some embodiments of the present disclosure, the O/C ratio is less than 0.6 and the H/C ratio is less than 0.9, more typically the O/C ratio is less than 0.5 and the H/C ratio is less than 0.5, or more typically the O/C ratio less than 0.3 and the H/C ratio is less than 0.1.

The ash content in the biochar contributes to the pozzolanic activity of biochar. In this regard, the siliceous or silico-aluminous material in the ash component of a biochar chemically react with calcium hydroxide (one of the main reaction products resulting from the hydration of Portland cement) to form compounds that have cementitious properties. In some embodiments of the present disclosure, the ash portion of the biochar may be classified as a Class F pozzolan according to ASTM C618-19. In some embodiments of the present disclosure, the ash content of the biochar is between 2% and 60%, between 2% and 30%, or more between 5% and 15% based on the weight of the biochar. In some embodiments of the present disclosure, the ash content of the biochar is at least 2%, at least 3%, at least 4%, at least 5%, at least 6%, at least 7%, or at least 8%, at least 9%, at least 10%, at least 11%, at least 12%, at least 13%, at least 14%, at least 15%, at least 20%, at least 25%, at least 30%, at least 35%, at least 40%, at least 45%, or at least 50% based on the weight of the biochar. In some embodiments of the present disclosure, the ash content of the biochar is about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40%, about 45%, about 50%, about 55%, about 60%, or any range within any two of these percentages of ash.

In addition to the Chapelle test noted above, the pozzolanic activity of biochar may be measured by the procedure outlined in Pontes, J. et al. *Mat. Sci, Forum* 2012, 730-732, 433-438, which measures the fixed $Ca(OH)_2$ content of a material via titration with an acid of known concentration. Pozzolanic materials can improve both the strength and durability of cementitious materials by reacting with the $Ca(OH)_2$ produced by the cement hydration reaction to produce additional calcium silicate hydrate. Therefore, a decrease in $Ca(OH)_2$ is an indication that the silicates present in the pozzolan have reacted to form calcium silicate hydrate. Since the presence of $Ca(OH)_2$ in cementitious materials contributes to several degradation mechanisms in concrete, a reduction in $Ca(OH)_2$ from the addition of biochar to the disclosed compositions means that the disclosed biochar containing compositions are not as prone to chemical degradation mechanisms as compared to traditional mixes. In various aspects, the biochar particles have a high pozzolanic activity, especially given the relatively low ash content in some biochars. In some embodiments, the pozzolanic activity of the biochar is at least 40% of class F fly ash, at least 50% of class F fly ash, at least 60% of class F fly ash, at least 70% of class F fly ash, or at least 80% of class F fly ash. The composition of class F fly ash is: 57.71% $SiO_2$, 25.86 $Al_2O_3$, 5.99% $Fe_2O_3$, 0.31% $SO_3$, 1.78% CaO, and 0.06% moisture. Class F fly ash has a loss in ignition of 2.40%, a fineness (% retained on a #325 Sieve) of 15.98%, and a true particle density of 2.34 g/cc.

Cement

The cement used in the cementitious compositions disclosed herein is preferably a hydraulic cement. In some embodiments of the present disclosure, the hydraulic cement is Portland cement. Examples of Portland cement include, but are not limited to: API Class A, Class G, or Class H; Ordinary Portland Cement (OPC) type I, type II, type III, type IV, or type V; or combinations thereof. In some embodiments of the present disclosure, Portland Cement type Ia, type IIa, and/or type Ma may also be used (i.e., in combination with one or more of the Portland cement types listed above). These types of Portland cement have the same composition as types I, II, and III except that an air-entraining agent is ground into the mix. In some embodiments of the present disclosure, the Portland cement is OPC, type I, type II, or combinations thereof.

In some embodiments of the present disclosure, the hydraulic cement is a non-Portland hydraulic cement. Suitable non-Portland hydraulic cements include, but are not limited to: alkali-activated slag cement, pozzolan-lime cements, slag-lime-cements, supersulfated cements, calcium aluminate cements, calcium sulfoaluminate cements, and combinations thereof.

In some embodiments of the present disclosure, the cement comprises a blend of two or more types of cements, for example, a blend comprising at least two types of Portland cements, a blend comprising Portland cement and a non-Portland hydraulic cement, or a blend comprising at least two types of non-Portland hydraulic cements.

Aggregate Material

The cementitious composition may further comprise an aggregate material. Aggregates, or aggregate materials, are inert granular materials that are used with a cementing medium to form concrete or hydraulic mortar. Aggregates can be classified according to their size and composition. Fine aggregates comprise particles that can pass through a ⅜-inch sieve (i.e., about 9.5 mm). Coarse aggregates comprise particles greater than about 9.5 mm, in some embodiments ranging between 9.5 mm and 37.5 mm in diameter. Generally, aggregates are added to the composition to provide compressive strength and bulk which improves the economy. Suitable aggregate materials include crushed rock, sand, gravel, recycled concrete, and combinations thereof.

In general, the aggregate component of a concrete or mortar mix is usually several times that of the cement. The ratio of cement and biochar to the aggregate will vary to suit the requirements of the cured solid. For example, a strong concrete mix generally comprises either one part cement to eight parts aggregate (v/v), or one part cement to three parts sand to five parts coarse aggregate. A general purpose concrete generally comprises either one part cement to five parts aggregate (v/v), or one part cement to two parts sand to three parts coarse aggregate. Foundation concrete generally comprises either one part cement to six parts aggregate (v/v), or one part cement to two and a half parts sand to three and a half parts coarse aggregate. Paving concrete generally comprises either one part cement to four parts aggregate (v/v), or one part cement to one and a half parts sand to two and a half parts coarse aggregate. Standard mortar mixes generally comprise one part cement to five parts sand (v/v), while strong mortar mixes generally comprise one part cement to four parts sand (v/v).

The amount of aggregate included in the cementitious composition can vary and, in some embodiments, between 40% and 95% by weight of the dry ingredients, in some embodiments between 60% and 85% by weight, or in some embodiments between 70% and 80% by weight. The aggregate material may comprise fine and/or coarse aggregates. In some embodiments of the present disclosure, the cementitious composition comprises sand as a fine aggregate. In some embodiments of the present disclosure, the cementitious composition comprises sand and a coarse aggregate.

Super Plasticizers

The cementitious compositions disclosed herein may comprise one or more superplasticizers (also known as water reducers) to increase the workability and/or reduce the water to cement ratio (w/c) of the wet mixture. Non-limiting examples of suitable superplasticizers are: sulfonated melamine formaldehyde, sulfonated naphthalene formaldehyde condensates, acetone sulfonate formaldehyde condensate, a sulfamate formaldehyde condensate, lignosulfonates, polycarboxylates, and combinations thereof. In some embodiments of the present disclosure, the superplasticizer is a polycarboxylate. Polycarboxylates are high molecular weight surfactant polymers. The polymer structure can be modified to tailor performance to specific needs, for example in some embodiments the length of the polymer backbone can be adjusted along with the number of side chains per carboxylate group and the length of the side chain, and/or other monomers, such as those containing sulfonate groups, can also be used in the backbone to tailor performance. Suitable polycarboxylate superplasticizers for use with the disclosed compositions are selected from methoxy polyethylene glycol (MPEG), allyloxy polyethylene glycol (APEG), tresylated polyethylene glycol (TPEG), and isobutylene alcohol polyoxyethylene ether (HPEG). In some embodiments of the present disclosure, the polycarboxylate superplasticizer is a high range water reducing superplasticizing mixture including a polycarboxylate polymer (e.g., ViscoCrete®, Sika® Corporation, Lyndhurst, New Jersey; ADVA® High-Range Water Reducers, GPC Applied Technologies®, Cambridge, Massachusetts).

The amount of superplasticizer included in the cementitious composition can vary and, in some embodiments, amount of superplasticizer ranges from 0.5% to 15% by weight based on the weight of the cement, in some embodiments from 0.5% to 5% by weight based on the weight of the cement.

Additives

Optionally, the cementitious compositions disclosed herein may comprise one or more additives to modify the setting speed, improve strength properties, stability, workability, and/or other properties of the compositions. For example, in some embodiments a cementitious composition comprises one or more of accelerators, air detrainers or air entrainers, binders, coloring agents, corrosion inhibitors, light-weighting additives, pumping aids, retarder, shrink reducers, water reducers, pozzolans, slag, or combinations thereof, tailored to, and depending upon, the specific application of the cementitious composition and the requirement for the cured solid.

In some embodiments of the present disclosure, a cementitious composition comprises one or more accelerators to accelerate early strength development and setting. Non-limiting examples of accelerators are: triethanolamine, calcium formate, sodium thiocyanate, silica fume, calcium chloride, calcium nitrite, calcium nitrate, finely divided silica gel, and combinations thereof.

In some embodiments of the present disclosure, a cementitious composition comprises one or more air detrainers to eliminate foaming and minimize air entrainment. Non-limiting examples of air detrainers are: tributyl phosphate, dibutyl phthalate, octyl alcohol, water insoluble esters of carbonic and boric acids, silicones, and combinations thereof.

In some embodiments of the present disclosure, a cementitious composition comprises one or more air entrainers to facilitate the development of a system of microscopic air bubbles within concrete during mixing thereby increasing the freeze-thaw durability, increasing resistance to scaling caused by deicing chemicals, and/or improve workability. Non-limiting examples of air entrainers include: salts of wood resins, synthetic detergents, salts of sulfonated lignin, salts of petroleum acids, salts of proteinaceous material, fatty and resinous acids and their salts, alkylbenzene sulfonates, salts of sulfonated hydrocarbons, and combinations thereof.

In some embodiments of the present disclosure, a cementitious composition comprises one or more binding agents, other than cement. Nonlimiting examples of binding agents are: geopolymers and alkali activated materials, and combinations thereof.

In some embodiments of the present disclosure, a cementitious composition comprises one or more coloring agents. Non-limiting examples of coloring agents include: modified carbon black, iron oxide, phthalocyanine, umber, chromium oxide, titanium oxide, cobalt blue, and combinations thereof.

In some embodiments of the present disclosure, a cementitious composition comprises one or more corrosion inhibitors to extend the time to corrosion initiation and/or reduce the corrosion rate of embedded metal in concrete containing chlorides. Nonlimiting examples of corrosion inhibitors are: amine carboxylate, amine-ester organic emulsion, calcium nitrite, organic alkenyl dicarboxylic acid salt, and combinations thereof.

In some embodiments of the present disclosure, a cementitious composition comprises one or more light weighting additives to reduce the weight of concrete. An example of a light weighting additive is expanded polystyrene (EPS) beads.

In some embodiments of the present disclosure, a cementitious composition comprises one or more pumping aids to increase the flowability of the cementitious composition thereby making it easier to pump through a line. Non-limiting examples of pumping aids include: organic and synthetic polymers, organic flocculants, organic emulsions of paraffin, coal tar, asphalt, acrylics, bentonite and pyrogenic silicas, hydrated lime, and combinations thereof.

In some embodiments of the present disclosure, a cementitious composition comprises one or more retarders to slow-down hydration so that the cementitious composition remains plastic and workable for a longer period of time. Non-limiting examples of retarders include: lignin, borax, sugars, tartaric acid, salts of any of the foregoing, and combinations thereof.

In some embodiments of the present disclosure, a cementitious composition comprises one or more shrinkage reducers to reduce the early and/or long-term shrinkage that occurs during curing of the cementitious composition. Non-limiting examples of shrinkage reducers include: polyoxyalkylene alkyl ether, propylene glycol, or both.

In some embodiments of the present disclosure, a cementitious composition comprises one or more water reducers, in addition to or instead of the superplasticizer described above. Non-limiting examples of water reducers include: lignosulphonates, hydroxycarboxylic acids, carbohydrates, specialized organic compounds such as glycerol, polyvinyl alcohol, sodium alumino-methyl-siliconate, sulfanilic acid, and casein; and combinations thereof.

In some embodiments of the present disclosure, a cementitious composition comprises one or more pozzolans, in addition to the biochar. Examples of pozzolans include: fly ash, silica fume, metakaolin, and combinations thereof. Fly ash is a byproduct from burning pulverized coal in electric power generating plants. Silica fume is a byproduct of producing silicon metal or ferrosilicon alloys. Metakaolin is the anhydrous calcined form of the clay mineral kaolinite.

In some embodiments of the present disclosure, a cementitious composition comprises slag. Slag is a by-product of smelting (pyrometallurgical) ores and used metals. The use of slag in concrete has several benefits, including reduced energy, reduced use of raw materials, and improved strength. Various types of slag include: blast furnace slags, air-cooled blast furnace slag, basic oxygen furnace slag, electric arc furnace slag, and combinations thereof.

Compositions

In some embodiments of the present disclosure, the disclosed cementitious compositions are free-flowing particulate mixtures comprising particulate biochar, a hydraulic cement binder, an aggregate material, and optionally one or more additives. In some embodiments of the present disclosure, the amount of aggregate included in the free-flowing particulate mixture may be between 40% and 95% by weight of the free-flowing particulate ingredients, and/or as noted above. The remainder of the free-flowing particulate mixture is cement, biochar, and any additives, if present.

The amount of biochar used as a cement replacer in the disclosed cementitious compositions is not particularly limited as long as the mechanical properties of the cured cementitious solid are not compromised and/or remain suitable for a particular application. In various aspects, higher amounts of biochar (and hence lower amounts of cement) are beneficial as this reduces the carbon footprint associated with the composition. Additionally, at some biochar replacement levels the mechanical properties of the cured composition may also improve, as provided herein.

In the present disclosure, the biochar replacement level or % biochar can vary. In some embodiments of the present disclosure, the biochar replacement level in a cementitious composition provided by the present disclosure is at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 25%, or at least 30%. In some embodiments of the present disclosure, the biochar replacement level in a cementitious composition is about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, or any range within any two of these percentages of biochar. In some embodiments of the present disclosure, the biochar replacement level in a cementitious composition is between 0.5% and 40%, between 1% and 32%, between 5% and 20%, or between 10% and 20%.

In other embodiments, the cementitious composition is a wet mixture or a ready mixture. The wet mixture is formed from the addition of water and superplasticizer to the free-flowing particulate mixture described above. In various embodiments, the amount of water included in the wet mixture is between 5% and 20% by weight, between 5% and 15% by weight, or between 10% and 15% by weight. In some embodiments of the present disclosure, the wet mixture possesses a suitable workability (flow) and also the required durability and strength for the hardened cured concrete. This is achieved by controlling the amount of water (e.g., the water to cement ratio), for example by the use of a superplasticizer and/or by adjustments of the biochar particle size distribution, to improve workability.

The water to cement ratio (w/c) is the ratio of the weight of water to the weight of cement used. For the purposes of determining the w/c, the biochar is not included as part of the cement. In some embodiments of the present disclosure, the wet mix cementitious compositions disclosed herein have a w/c between 0.30 and 0.70, between 0.35 and 0.60, between 0.35 and 0.45. In some embodiments of the present disclosure, the w/c ratio is about 0.35, about 0.36, about 0.37, about 0.38, about 0.39, about 40, about 0.41, about 0.42, about 0.43, about 0.44, about 0.45, about 0.46, about 0.47, about 0.48, about 0.49, about 0.50, about 0.51, about 0.52, about 0.53, about 0.54, about 0.55, about 0.56, about 0.57, about 0.58, about 0.59, about 0.60, about 0.61, about 0.62, about 0.63, about 0.64, about 0.65, about 0.66, about 0.67, about 0.68, about 0.69, about 0.70, or any range within any two of these w/c. In general, a low w/c leads to higher strength and durability in the cured solid.

The flow of the wet mixture may be modulated though the addition of a superplasticizer, as noted above. The biochar used herein has a high water adsorption/holding capacity (in some embodiments about 10% of the weight of the biochar), and it initially withholds water from the wet mix, decreasing the flow. Too low of a flow may reduce compaction during pouring which impacts the strength of the cured solid. Generally, the amount of superplasticizer required to maintain a targeted flow at a given w/c increases as the biochar content in the composition increases, or the weight ratio of the superplasticizer to cement increases as the biochar content in the composition increases. In the wet cementitious mixtures disclosed herein, the compositions comprise an amount of superplasticizer to obtain a suitable flow while maintaining the w/c within the ranges described above. In some embodiments of the present disclosure, the flow may be between 99% and 140% according to ASTM C1437, or between 99% and 125% according to ASTM C1437. In some embodiments of the present disclosure, slump may be between 0 mm and 250 mm according to ASTM C1437, for example, in some instances between 50 mm and 200 mm, or between 100 mm and 150 mm, depending upon the application.

In some embodiments of the present disclosure, the cementitious composition is a cured or hardened solid that is formed by shaping and curing the wet mixture described above. The resultant solid is not particularly limited and may possess suitable properties for high strength applications. The solid may be a precast concrete structure and/or a reinformed concrete structure.

In some embodiments of the present disclosure, the addition of biochar as a cement replacer to the disclosed compositions has a minimal impact on compressive strength (e.g., at 28-days curing) of the compositions. The compressive strength may be measured according to ASTM C109, as noted above. In some embodiments of the present disclosure, the compressive strength is approximately the same or only slightly decreased compared to a control sample without biochar (e.g., the 28-day compressive strength is decreased by less than 10% compared to a control sample) in compositions with higher biochar replacement levels. In some embodiments of the present disclosure, the addition of biochar as a cement replacer to the disclosed compositions improves the compressive strength of the compositions (e.g., the 28-day compressive strength may increase by more than about 10%). In some embodiments of the present disclosure, the addition of biochar as a cement replacer improves the compressive strength of the compositions, compared to a control sample, by at least 5%, at least 10%, at least 15%, at least 20%, at least 25%, or at least 30%, or by about 5%, about 10%, about 15%, about 20%, by about 25%, by about 30%, or any range within any two of these percent increases. Without being bound by any particular theory, the increase in compressive strength may be due to the biochar serving as nucleation sites, uniformly dispersing the strength-producing hydration product in the concrete, the internal curing capacity of the biochar which helps to densify the cement matrix, and/or the pozzolanic activity of the biochar.

The compressive strength of concrete can vary. In some embodiments of the present disclosure, the water content and flow of the wet mixture used to form the solid, as well as the type and amounts of cement, aggregate materials, and certain additives, impact the compressive strength of the cured solid. In some embodiments of the present disclosure, the cured solids disclosed herein possess suitable properties for high strength and high performance applications. Generally, high strength applications require a compressive strength of at least 40 MPa, whereas high performance applications require a much higher compressive strength of at least 120 MPa.

In some embodiments of the present disclosure, the cured solid has a compressive strength of at least 5 MPa, of at least 10 MPa, of at least 20 MPa, of at least 40 MPa, at least 45 MPa, at least 50 MPa, at least 55 MPa, at least 60 MPa, at least 65 MPa, at least 70 MPa, at least 75 MPa, at least 80 MPa, at least 85 MPa, at least 90 MPa, at least 95 MPa, at least 100 MPa, at least 105 MPa, at least 110 MPa, at least 115 MPa, or at least 120 MPa. In some embodiments of the present disclosure, the cured solid has a compressive strength of about 5 MPa, about 10 MPa, about 20 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, about 105 MPa, about 110 MPa, about 115 MPa, or about 120 MPa, or any range within any two of these compressive strengths.

In some embodiments of the present disclosure, the addition of biochar as a cement replacer to the disclosed compositions has a minimal impact on flexural strength (e.g., at 28-days curing) of the compositions. The flexural strength may be measured according to ASTM C348, as noted above. In some embodiments of the present disclosure, the flexural strength is approximately the same compared to a control sample without biochar (e.g., the 28-day flexural strength may be within ±30% compared to a control sample). Note that in some embodiments of the present disclosure, a high flexural strength is not necessary and other characteristics and/or physical properties of a cementitious mixture is more important: e.g., compressive strength, $CO_2$ sequestering capacity, etc.

The cementitious compositions disclosed herein have a reduced carbon footprint, compared to comparative cementitious composition without biochar. In some embodiments of the present disclosure, the carbon footprint of the cementitious composition is reduced, compared to comparative cementitious composition without biochar, by at least 2%, at least 5%, at least 10%, at least 15%, at least 20%, at least 25%, at least 30%, at least 40%, at least 60%, at least 60%, at least 70%, at least 85%, or at least 95%. In other embodiments, the cementitious composition may comprise high enough biochar replacement levels, such that the cementitious composition has a carbon neutral or even a carbon negative footprint. The reduction in the carbon footprint associated with concrete production in and of itself offers a substantial improvement to current commercial concretes.

Methods

Specific details regarding the ingredients and/or components and the various compositions are provided in the above sections.

In some embodiments of the present disclosure, a method of making a cementitious mixture comprises: (i) providing biochar in a particulate form; and (ii) combining the particulate biochar with a hydraulic cement binder and one or more aggregate materials to form a mixture. In step (ii), at least 2% biochar, preferably at least 5% biochar, or more preferably at least 10% biochar by weight based on the total amount of the cement and biochar, may be mixed with the hydraulic cement binder and aggregate material. In some instances, the method may further comprise adding one or more additives to the mixture. In certain embodiments, the method may further comprise one or both prestep of (a) pyrolyzing a biomass material under fast pyrolysis condition comprising at a temperature of between 400° C. and 900° C., a pressure of between 0.05 atmosphere and four atmosphere, and a residence time of about 1 seconds to 10 seconds to form the biochar; and (b) milling the biochar to form a powder.

In some embodiments of the present disclosure, a method of making a wet cementitious mixture comprises: (i) providing biochar in a particulate form; (ii) combining the biochar with a hydraulic cement binder and one or more aggregate materials to form a mixture; (iii) adding water to the mixture in an amount sufficient to obtain a targeted w/c. The targeted w/c may be between 0.30 and 0.70, preferably between 0.35 and 0.65. In step (ii), at least 2% biochar, preferably at least 5% biochar, or more preferably at least 10% biochar, by weight based on the total amount of the cement and biochar, may be mixed with the hydraulic cement binder and aggregate material. In some instances, the method may further comprise adding a superplasticizer to the wet mixture in step (iii) to adjust the workability of the mixture. The slump of a concrete mixture is typically between 100 mm and 150 mm. In some instances, the method may further comprise adding one or more additives to the mixture in step (ii) and/or the wet mixture in step (iii). In certain embodiments, the method may further comprise one or both prestep of (a) of pyrolyzing a biomass material under fast pyrolysis condition comprising a temperature of between 400° C. and 900° C., a pressure of between 0.05 atmosphere and four atmospheres, and a residence time between 1 second and 10 seconds to form the biochar; and (b) milling the biochar to form a powder.

In some embodiments of the present disclosure, a method of making a cementitious structure comprises: (i) providing biochar in a particulate form; (ii) combining the biochar with a hydraulic cement binder and one or more aggregate materials to form a mixture; (iii) adding water to the mixture in an amount sufficient to obtain a targeted w/c; (iv) adding a superplasticizer in an amount sufficient to obtain a targeted flow; (v) pouring the wet mixture into a mold; and (vi) curing the wet mixture to form a cementitious structure. The targeted w/c may be between 0.35 and 0.70, preferably between 0.35 and 0.65. In step (ii), at least 2% biochar, preferably at least 5% biochar, or more preferably at least 10% biochar, by weight based on the total amount of the cement and biochar, may be mixed with the hydraulic cement binder and aggregate material. In some instances, the method may further comprise adding a superplasticizer to the wet mixture in step (iii) to adjust the workability of the mixture. The slump of a concrete mixture is typically between 100 mm and 150 mm. In some instances, the method may further comprise adding the method may further comprise adding one or more additives to the mixture in step (ii) and/or the wet mixture in step (iii). In certain embodiments, the method may further comprise the one or both prestep of (a) pyrolyzing a biomass material under fast pyrolysis condition comprising at a temperature of between 400° C. and 900° C., a pressure between 0.05 atmosphere and four atmosphere, and a residence time between 1 second and 10 seconds to form the biochar; and (b) milling the biochar to form a powder.

The following examples are provided to illustrate certain embodiments of the disclosure and are not to be construed as limitations on the disclosure, as set forth in the appended claims.

Example 1: Biochar Production

Biochar was produced from a feedstock blend of 60% air-classified forest residues, 30% clean pine, and 10% hybrid poplar having an average particle size 5 mm and an average particle density of 703 kg/m$^3$ and a moisture content of 6%. The biomass mixture was selected to mimic waste biomasses with a very low collecting cost and that can be used in an industrial-scale reactor and was pelletized before being crushed in the feeder system. The feedstock was fed into a laminar entrained flow reactor at a rate of about 15 kg/hr. The reactor wall temperature was maintained at 500° C. by using external heating jackets and the pressure was controlled at about 142.5 kPa. Hot nitrogen gas at 500° C. was used to entrain the biomass particles into the pyrolyzer. The residence time was 1-2 seconds. The produced biogas, bio-oil, water, and biochar at the reactor outlet were collected. The yield of biochar was about 18% by weight of the total product produced. Further details regarding the pyrolysis method are in Gao X. et al. *Chem. Eng. J.* 2021, 218, 129347.

The collected biochar was milled with a RockLabs Standard Ring Mill. Each batch weighed between about 250 to about 350 grams and was run for 3 minutes per batch. During milling, the microstructure of the (raw) biochar is destroyed. The resulting powder particle size was characterized by laser diffraction with a Horiba Particle Size Distribution Analyzer LA-950 and was found to have an average particle size ($D_{v,50}$) of 10 µm with a standard deviation of 3.5 µm.

The composition of the biochar is shown in Table 1. The proximate analysis was obtained according to ASTM D3172-89, the ultimate analysis according to ASTM D5373, and the elemental ash analysis according to ASTM D4326.

TABLE 1

FP biochar bulk characterization

| Proximate (% dry) | |
|---|---|
| Ash | 3.66 |
| Volatile | 18.87 |
| fixed C | 77.47 |
| Ultimate (% dry) | |
| Carbon | 83.91 |
| hydrogen | 3.3 |
| nitrogen | 0.29 |
| Sulfur | 0.032 |
| Ash | 3.66 |
| Oxygen | 8.81 |
| Elemental analysis of ash (% of ash) | |
| $SiO_2$ | 49.41 |
| $Al_2O_3$ | 8.52 |
| $TiO_2$ | 0.28 |
| $Fe_2O_3$ | 2.13 |
| CaO | 10.44 |
| MgO | 4.10 |
| $Na_2O$ | 0.56 |
| $K_2O$ | 9.63 |
| $P_2O_5$ | 2.32 |
| $SO_3$ | 6.42 |
| Cl | 0.02 |
| $CO_2$ | 3.39 |
| Median particle size of milled char | 9.3 µm |
| Mean particle size of milled char | 10.0 µm |

The pozzolanic reactivity of the biochar was determined via a modified Chapelle Test. This procedure measures the reduction of $Ca(OH)_2$ via consumption by the siliceous pozzolanic material in the biochar. Specifically, a mixture of 3 grams of CaO was combined with 1 gram of biochar and 250 mL of deionized water and mixed with a magnetic stirrer at 500 rpm while being heated to 90° C. for 16±2 hours. Once the mixture was cooled, 250 mL of a 0.7 M saccharose solution was added to dissolve the free $Ca(OH)_2$. The solution was filtered through grade six filter paper (with 3-µm pores) until at least 100 mL of filtrate was obtained. An amount of 25 mL of filtrate was measured out and 4-8 drops of phenylethylene indicator were added. The consumption of $Ca(OH)_2$ was determined via titration with 0.1 M HCl until the equivalence point was reached. A blank trial was run with 3 grams of CaO and no pozzolan to determine the volume of HCl consumed without any pozzolanic activity. The volume of 0.1 M HCl consumed in the blank trial ($v_2$) was 51.12 mL, while the volume consumed by pozzolanic solution ($v_1$) was 48.82 mL and 47.88 mL for the biochar and fly ash solution, respectively. The amount of $Ca(OH)_2$ consumed in mg per gram of pozzolan is calculated by: mg of $Ca(OH)_2=3.7\ [(v_2-v_1)]$, where the coefficient is a conversion factor.

Figure 1:
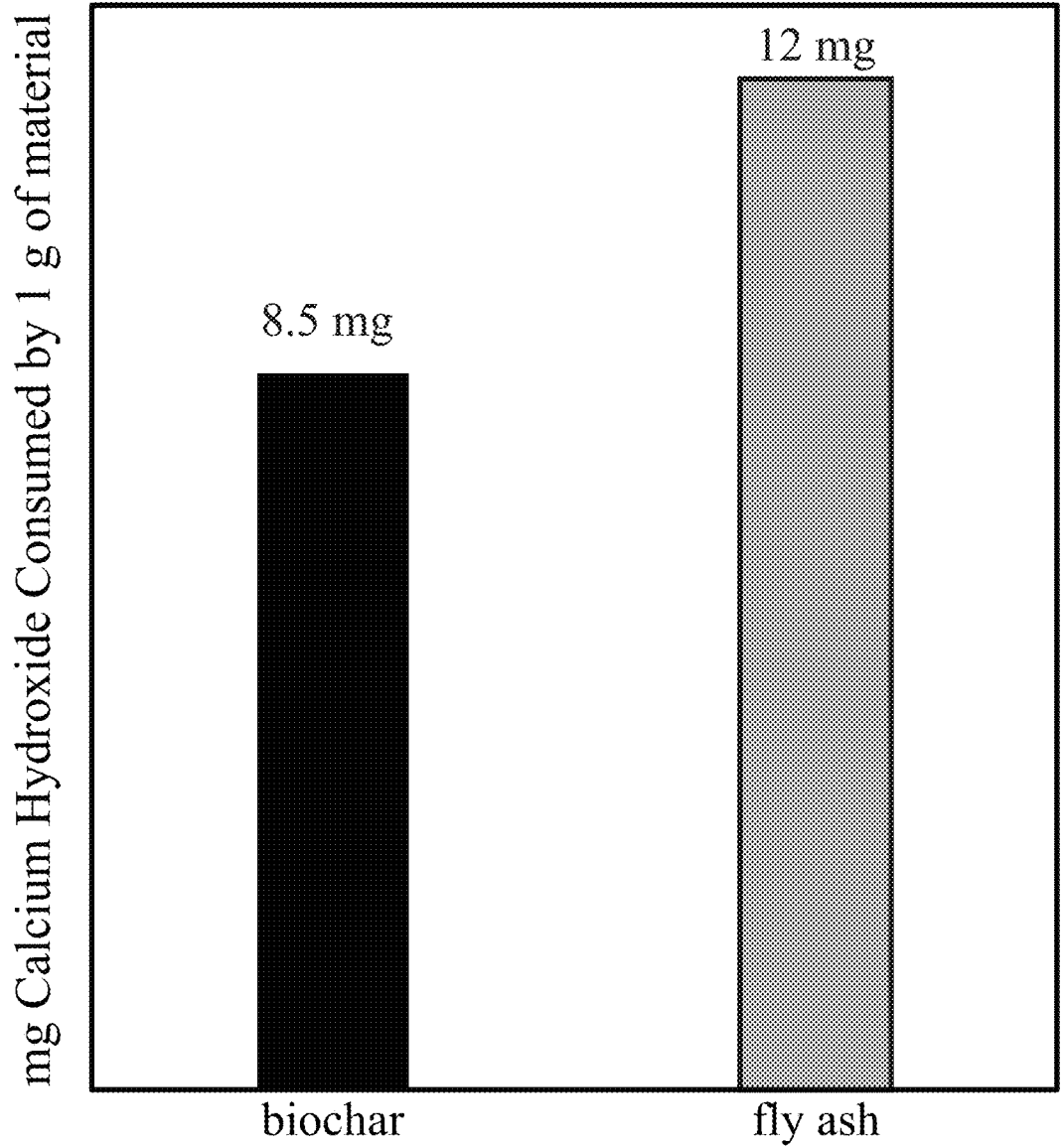
FIG. 1 illustrates the pozzolanic activity of biochar (black) compared to a class F fly ash (grey), as indicated by calcium hydroxide consumption.

FIG. 1 compares the pozzolanic activity of biochar compared to a class F fly ash, as indicated by calcium hydroxide consumption The results show that despite the low ash content in the biochar, the biochar has about 70% the pozzolanic activity of a class F fly ash, by mass.

Example 2: Preparation of Biochar Mortar Samples

To explore the effect of fast-pyrolysis biochar as a cement replacer, mortar samples comprising varying amounts of biochar as a cement replacer were prepared. The biochar powder was produced according to the method outlined in Example 1. The cement used was type I/II cement powder from Holcim and the sand was Ottawa Test Sand sourced from Humboldt, conforming to ASTM C150 and C778 respectively. The composition of the various mortars is provided in Table 2. The amount of biochar in each mortar is reported as the percent biochar based on the total amount of cement and biochar, expressed as a percent. Control mortar samples, without biochar, were also prepared.

TABLE 2

Compositions of mortar samples.

| Mix Name | Water/ Cement | Cement (kg/m$^3$) | Sand (kg/m$^3$) | Water (kg/m$^3$) | Biochar (kg/m$^3$) | SP: cement |
|---|---|---|---|---|---|---|
| Control | 0.4 | 646.5 | 1440.8 | 258.6 | 0 | 0.3% |
| 2% Biochar | 0.4 | 640.9 | 1428.4 | 256.1 | 13.4 | 0.4% |
| 6% Biochar | 0.4 | 629.4 | 1402.7 | 250.8 | 41.1 | 0.7% |
| 10% Biochar | 0.4 | 617.3 | 1375.7 | 245.3 | 70.2 | 1.1% |
| 15% Biochar | 0.4 | 601.3 | 1340.1 | 238.0 | 108.7 | 1.5% |

The mortar samples were prepared by mixing the dry ingredients (biochar, cement, and sand) using a 5 L KitchenAid stand mixer with the whisk attachment at a low speed to limit airborne particles/mass loss until the mixture was visibly homogeneous. While mixing, 90% of the mix water (unfiltered tap water) was slowly poured into the dry materials. Next, the remaining 10% of the mix water was mixed with a few grams of Sika® ViscoCrete®-2100, a liquid high-range water reducer (superplasticizer (SP)) made from a polycarboxylate polymer formulation and added to the mixer. For each sample, the w/c was 0.4. Because the biochar was not stored in humidity-regulated environments, the ambient moisture content of the biochar (1.8% of the biochar mass) was taken into consideration and that proportion of the mix water was subtracted so that the overall w/c in each of the mortar samples was consistent. Additional superplasticizer was added to the composition, 1 gram at a time with a micropipette, until the desired consistency was reached, alternating mixing with stopping to scrape down the sides and reincorporate the material with a silicone spatula. The flow of the wet mortar mixture was measured per ASTM C1437. All mortar mixes for this investigation fell within the 99%-140%. The flow for the various samples was kept consistent to ensure poor compaction would not be a factor in strength measurements. Due to the hygroscopic nature of biochar, the amount of superplasticizer required to obtain the targeted flow increased as the percentage of biochar in the composition increased.

Once the flow of the mixes fell in the appropriate range, the wet mixes were moved to greased steel molds, cubic molds for compressive strength testing and prismatic molds for flexural strength testing. The molds were placed on a consolidation table for ~10 minutes until all trapped air had been removed. The molds were covered and placed in a humidity chamber with ~70% relative humidity for the first 24 hours to harden. After 24 hours, the samples were demolded and added to a saturated limewater bath to moist cure until the desired testing age.

Example 3: Compressive Strength Testing of Biochar Mortar Samples

Compressive strength testing was performed on 50-mm cubes produced from the mortar samples of Example 2, as described by ASTM C109. The samples were cured in a saturated limewater bath until the desired testing age (3, 7, 14, or 28 days) and then surface dried prior to testing. An axial force was applied to compress the cube at a ramp rate of 50 psi/s until the sample failed.

Figure 2:
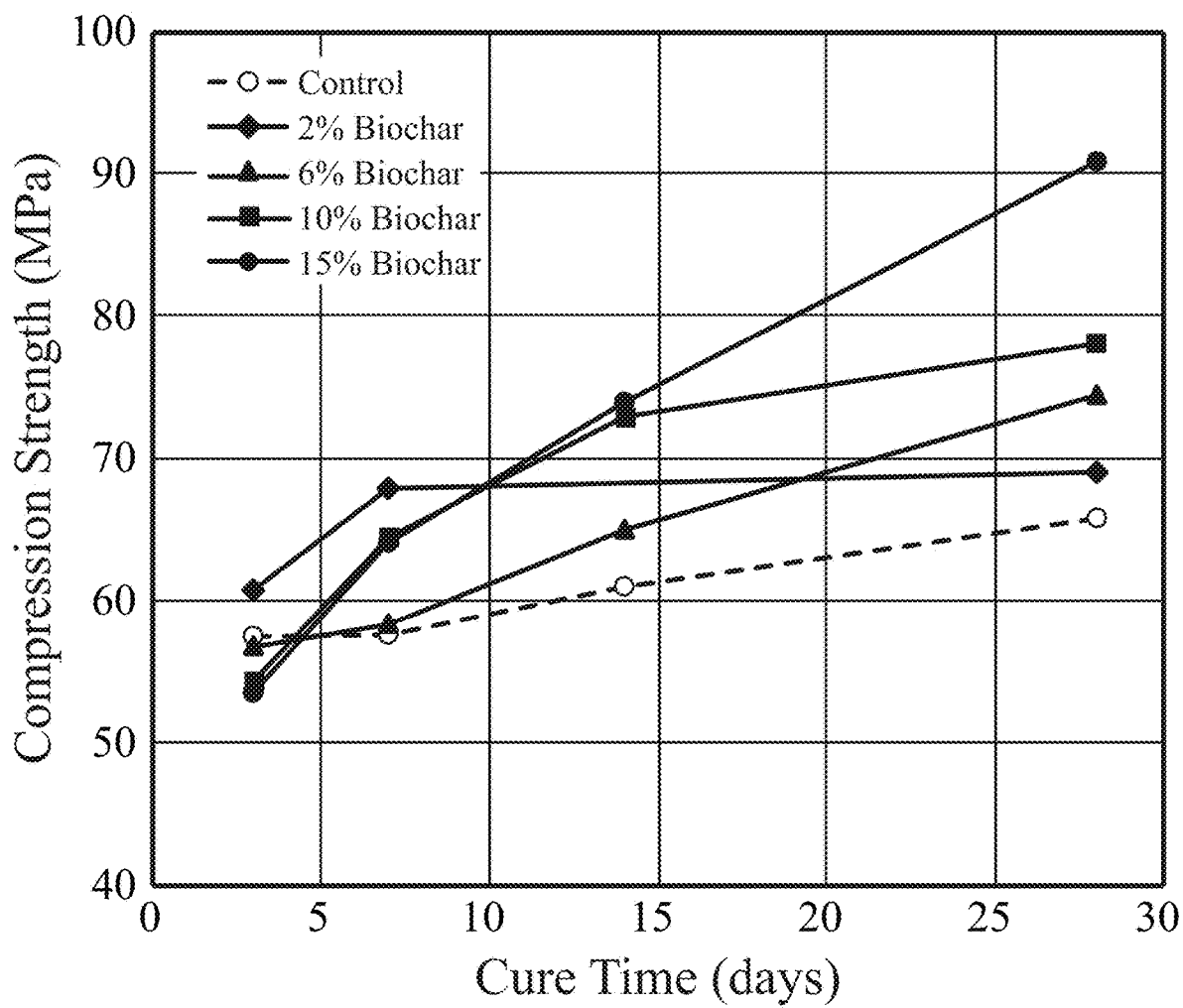
FIG. 2 illustrates a plot of the compressive strength of biochar mortar samples with varying amounts of biochar (2% (♦), 6% (▲), 10% (■), and 15% (●)) compared to a control mortar sample (○) as a function of sample age.

The results from the compressive strength test are summarized in FIG. 2. The fast pyrolysis biochar used in this study increases the 28-day compressive strength of mortars at all replacement levels (2%, 6%, 10%, and 15%), with strength gains increasing with increasing biochar content. The 28-day compressive strength of the 15% biochar sample was 38% higher than the 28-day compressive strength of the control sample. The rate of strength development in biochar mortars differs from the rate of strength development in traditional OPC mortars. While the biochar mixes exceed the compressive strength of the control mortar after 7 days, at 3 days the mixes with higher biochar content have a decreased compressive strength compared to the control. This may be due to a decreased degree of hydration in biochar mortars at early ages, compared to the control.

Example 4: Flexural Strength Testing of Biochar Mortar Samples

Flexural strength testing was performed on 40×40×160 mm rectangular prisms produced from the mortar samples of Example 2, as described by ASTM C348. The samples were cured in a saturated limewater bath until the desired age (3, 7, 14, or 28 days) and then surface dried prior to testing. This three-point bending setup applied a load to the middle of the prism at a rate of 4 psi/s until the sample failed.

Figure 3:
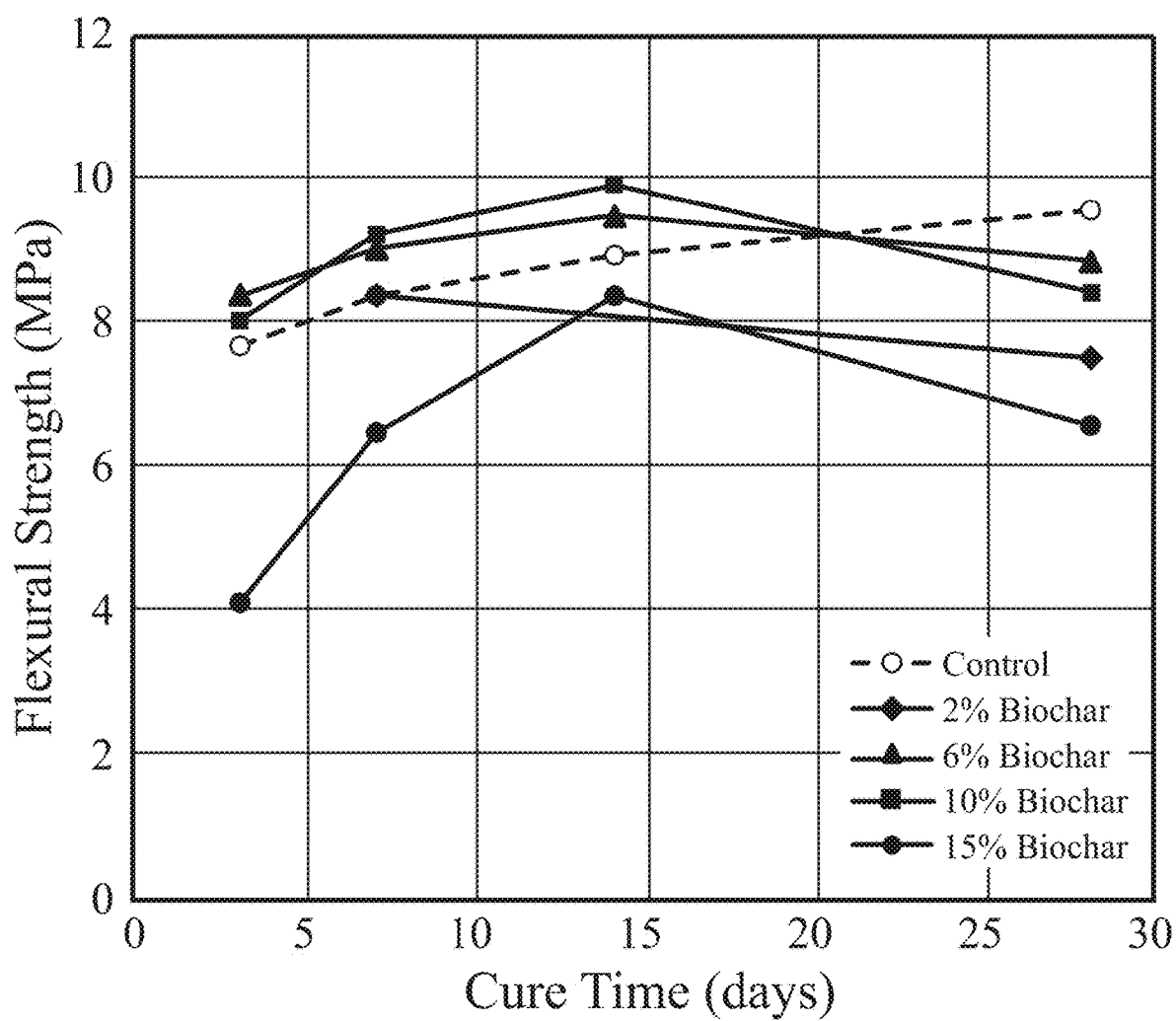
FIG. 3 illustrates a plot of the flexural strength of biochar mortar samples with varying amounts of biochar (2% (♦), 6% (▲), 10% (■), and 15% (●)) compared to a control mortar sample (○) as a function of sample age.

The results from the flexural strength test are summarized and in FIG. 3. Like the compressive strength observations, the flexural strength of biochar mortars, compared to a control, also depends on the cure time. At 3, 7, and 14 days, the 2%, 6%, and 10% biochar mixes retain or improve the flexural strength of mortars compared to the control; however, at 28 days the strength of the biochar mixes decreases compared to the 7-day strength, ultimately having a lower strength than the control at 28 days. The 15% biochar mix has the lowest flexural strength at all cure ages and exhibits a similar trend of decreased strength between 7 and 28 days.

Example 5: Porosity and Surface Area of Biochar Mortar Samples

The pore size distribution and the specific surface area of the cured mortar samples were measured using Nitrogen adsorption (NAD) in conjunction with the Barrett-Joyner-Halenda (BJH) and Braunuer-Emmett-Teller (BET) analysis methods. All of the samples tested with NAD were collected from internal compressive strength fracture pieces from Example 3. The pieces were immediately submerged in isopropanol to arrest internal hydration (solvent exchange with the internal pore water). After at least 24 hours of solvent exchange, the isopropanol was decanted, and the fracture pieces were oven dried at 50° C. until dry. The dried pieces were then ground with a mortar and pestle until the fragments passed sieve number 14 (1.4-mm mesh size) but did not pass sieve number 25 (710-µm mesh size). The pieces were then stored in fresh isopropanol until NAD testing. When the ground samples were ready to be tested, they were dried at 50° C. for at least 24 hours and then degassed in the Micromeritics ASAP 2020 Plus at 50° C. for 18±2 hours.

Figure 4:
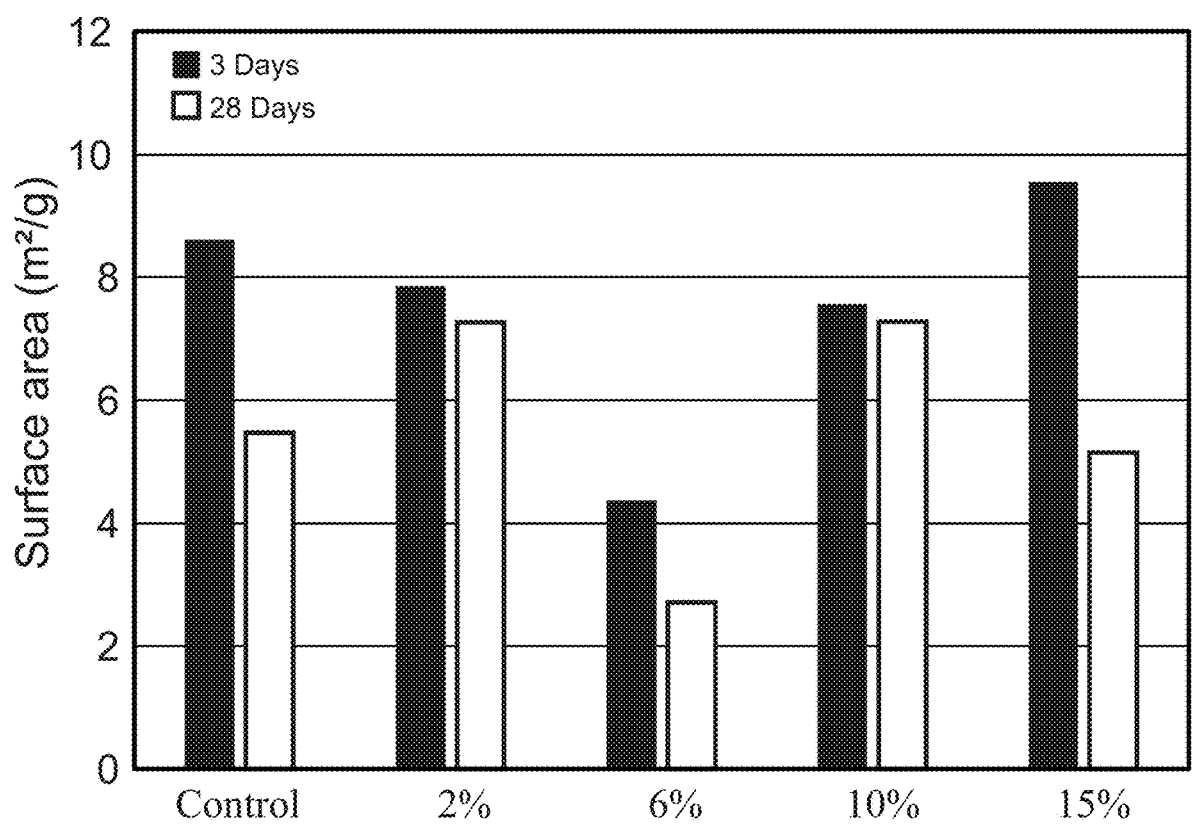
FIG. 4 illustrates a plot of the specific surface areas of biochar mortars with varying amounts of biochar (2%, 6%, 10%, and 15%) as compared to a control mortar sample at 3 days (black) and 28 days (white) of aging.

FIG. 4 illustrates the specific surface area of the biochar loaded mortars versus the control sample. In all cases, for a given sample, the surface area decreases with curing. Compared to the control samples, the 2%, 6%, and 10% mixes had a lower surface area at 3-days cure time, but the 15% mixes had an increase in surface area. At 28-days of cure time, the 2% and 10% mixes had an increased surface area compared to the control sample, while the 6% mix had a notable lower surface area compared to the control.

Generally, changes in both the compressive and flexural strength of a cementitious material can be attributed to changes in capillary porosity (porosity from pores larger than 50 Å), with larger capillary pore volumes corresponding to decreased strength and increased permeability. While the inclusion of the fast pyrolysis biochar was found to decrease the capillary pore volume of the mortar samples (Table 3) degree of pore densification does not correspond to the expected increases in strength. For instance, compared to the control mortar sample, the 6% biochar mortar sample shows the largest degree of pore densification at both 3- and 28-days cure time, followed by the 10%, 15%, and 2% mortar samples. Since the strength of a material is contributed by its solid phase, one might anticipate that the 6% biochar mix has the highest 28-day compressive and flexural strength, but instead the compressive strength increases with increasing biochar content (see FIG. 2) and the flexural strength decreases with increasing biochar content, with the exception of the 2% mix (see FIG. 3). The rate of capillary pore densification is also inconsistent, with the 15% mix showing the largest capillary pore densification between 3- and 28-days cure time, followed by the 6%, 10%, control, and 2% mixes, respectively. Notably, the capillary volume of the 15% biochar mortar sample increase at 3-days of curing, relative to the control mortar sample, but then decreases upon 28-days of curing. Although the biochar does facilitate capillary pore densification, the inconsistent trend between pore refinement and strength improvement suggests that there are multiple mechanisms that control strength development in biochar mortars and the dominant mechanism may change depending on biochar loading and cure age.

TABLE 3

Capillary Porosity of Biochar Mortar Mixes Compared to a Control (no Biochar).

| Mortar Mix | Age (days) | Capillary Pore Volume (cm³/g) | Capillary Pore Densification from 3 to 28 days (%) | Capillary Pore Densification Compared to Control at 3 days (%) | Capillary Pore Densification Compared to Control at 28 days (%) |
|---|---|---|---|---|---|
| Control (no biochar) | 3 | 0.0348 | 15.2 | — | — |
|  | 28 | 0.0295 |  |  |  |
| 2% biochar mix | 3 | 0.0340 | 12.3 | 2.25 | 4.87 |
|  | 28 | 0.0298 |  |  |  |
| 6% biochar mix | 3 | 0.0277 | 33.2 | 20.3 | 33.1 |
|  | 28 | 0.0185 |  |  |  |
| 10% biochar mix | 3 | 0.0328 | 26.1 | 5.75 | 17.6 |
|  | 28 | 0.0242 |  |  |  |
| 15% biochar mix | 3 | 0.0408 | 49.9 | −17.3 | 7.73 |

Figure 5:
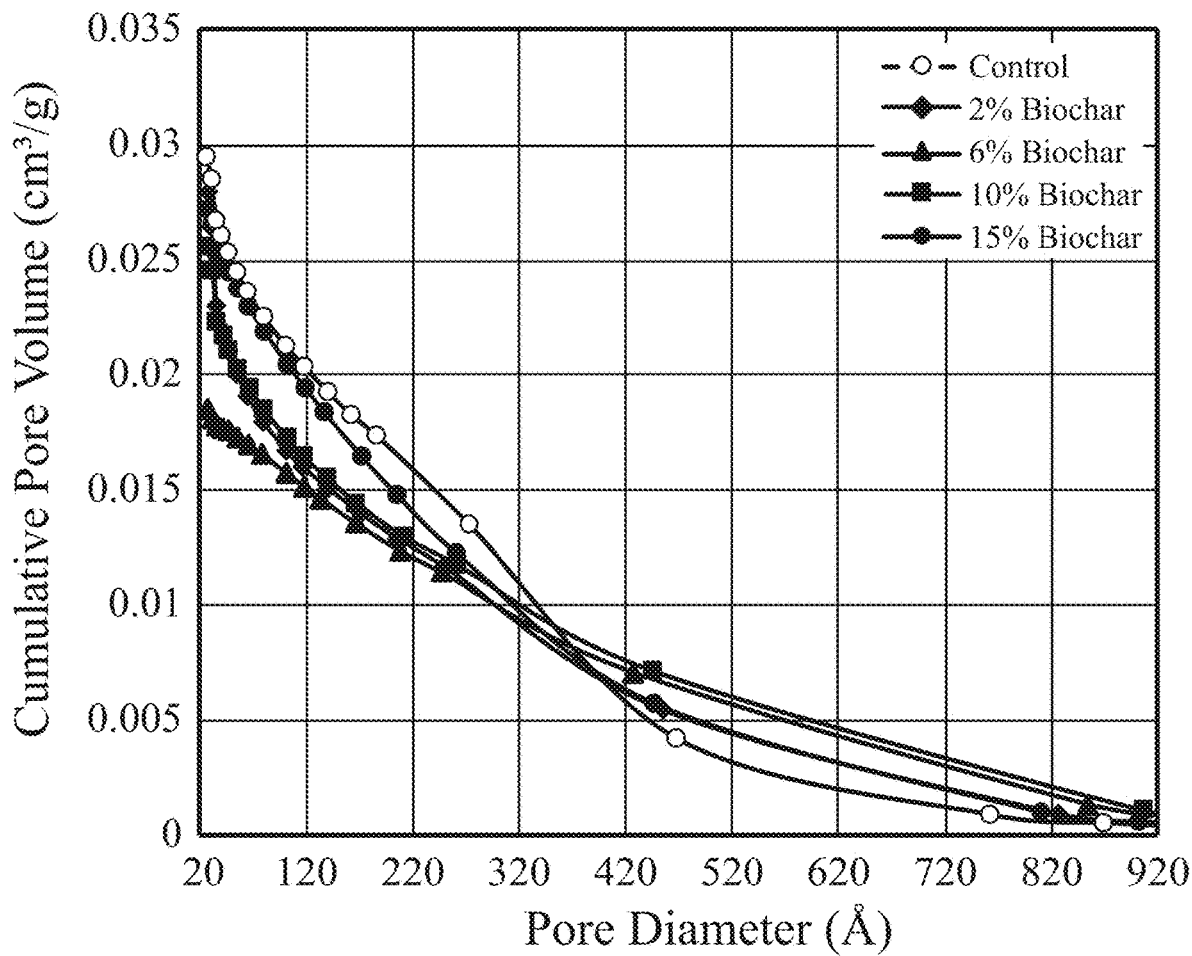
FIG. 5 illustrates a plot of the cumulative pore volume of biochar mortars with varying amounts of biochar (2% (♦), 6% (▲), 10% (■), and 15% (●)) as compared to a control mortar sample (○) at 28 days aging.
Figure 6:
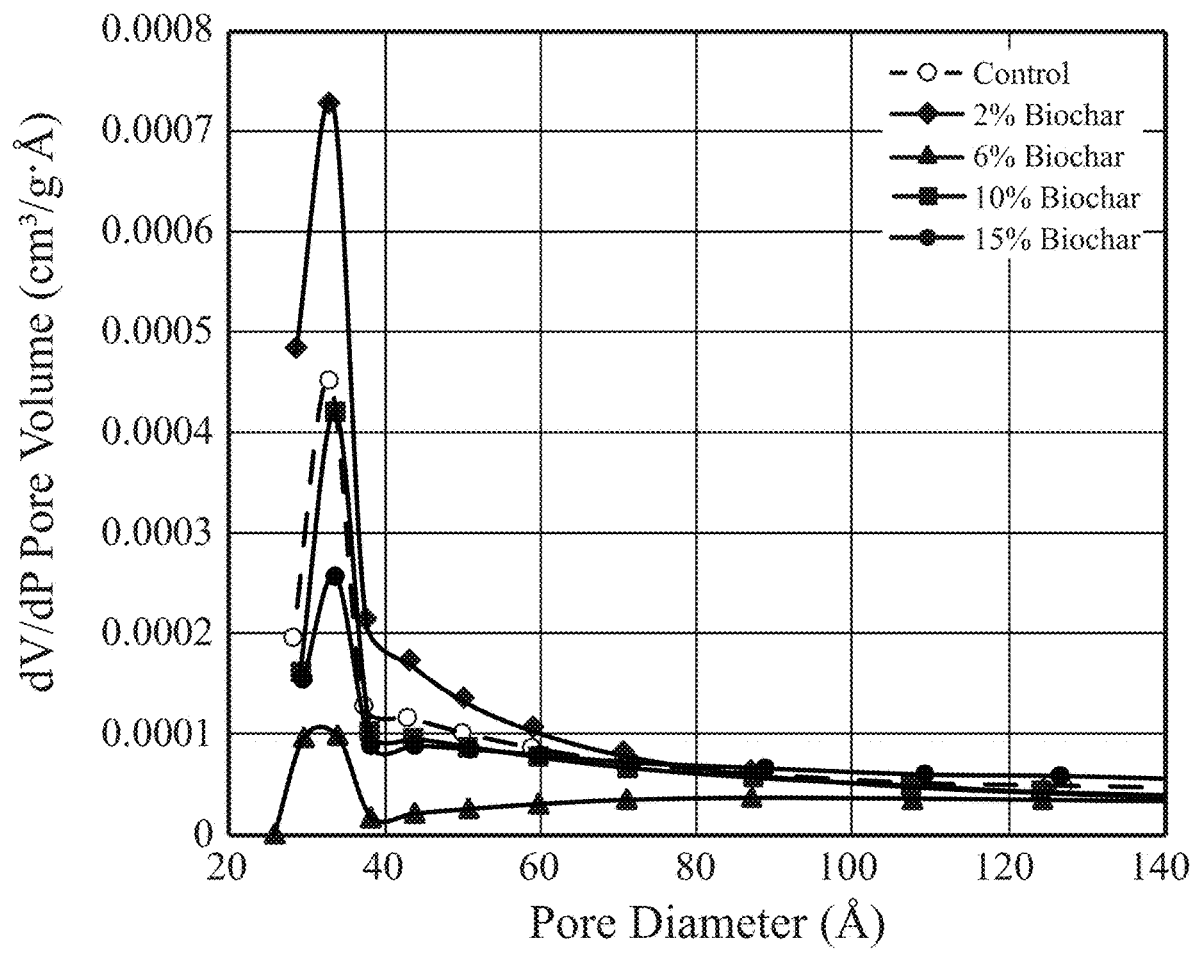
FIG. 6 illustrates a plot of the pore size distributions of biochar mortars with varying amounts of biochar (2% (♦), 6% (▲), 10% (■), and 15% (●)) compared to a control mortar sample (○) at 28 days aging.

Additional changes to the cement microstructure with the addition of biochar are evident in comparing the cumulative pore volume and pore size distributions of the biochar mortars with the control (see FIG. 5 and FIG. 6, respectively). For instance, the biochar appears to refine pores below ~37 nm but coarsen larger pores (see FIG. 5); although the cumulative pore volume of biochar mortars is always less than the control. The biochar also strongly influences the pore size distribution of very small pores (~2-4 nm) and the change does not vary consistently with biochar loading (see FIG. 6). Since water is tightly bound in pores of this size, samples with an increased number of pores in this range (such as the 2 and 10% biochar mix) would be expected to undergo more severe drying shrinkage and creep than the control.

Example 6: Degree of Hydration

While the compressive strength of the biochar containing mortar samples exceed that of control mortar sample after 7 days of cure time, at only 3 days of cure time the mortar samples with higher biochar content have a decreased compressive strength compared to the control (see FIG. 2). This phenomenon may be due to a decreased degree of hydration in biochar mortars at early cure times, compared to the control.

To investigate this hypothesis, the degree of hydration (DOH) of a 15% biochar-cement paste and a control cement paste was measured using XRD. The pastes were prepared using a similar method as that described in Example 2, except that sand was excluded from the composition. The pastes were cured in limewater, just like the mortars, for 7 and 28 days. After the desired cure time, sections were cut off and interior fracture samples were collected and submerged in isopropanol to arrest hydration. After two weeks of solvent exchange, the fracture pieces were dried in a 50° C. oven and then ground with a mortar and pestle until the material passed through a #200 sieve (75-μm mesh). The powder was again submerged in isopropanol until testing and then redried at 50° C. Prior to XRD testing, 75-μm KBr powder was added at 25 wt % of the overall sample, to be used as an internal standard. X-ray diffraction (XRD) was conducted with powdered samples in an X'Pert scanner using a copper Kα source. The diffractometer was fixed with a 4 mm fixed mask, ¼° anti-scatter slit, and a ¹⁄₁₆° divergence slit. The scans were done with a step size of 0.02°, scanning for 81.3 seconds per step, from 2Θ=20-80°. The raw XRD spectra were analyzed in HighScore. The background was identified to normalize the counts of all peak heights between scans and the peaks were identified and fit to the phases in Table 4. Rietveld refinement was run to quantify the mass percentages of the phases identified. Calculation of DOH for the biochar mortar accounts for the reduction in overall cement content. In other words, since the 15% biochar mixes only have 85% cement, the reported anhydrous cement is normalized by 0.85, and the DOH is adjusted accordingly.

TABLE 4

XRD phase identifications used to study mortars

| Phase | Chemical Formula | ICDD Number |
|---|---|---|
| Potassium Bromide (internal standard) | KBr | 00-004-0531 |
| Alite | $Ca_3(SiO_4)O$ | 04-019-5754 |
| Belite | $Ca_2(SiO_4)$ | 04-013-6294 |
| Ferrite | $Ca_2Fe_{1.134}Al_{0.866}O_5$ | 04-014-6637 |
| Aluminate | $Ca_{12}Al_{14}O_{32.5}$ | 04-015-0819 |
| Lime | CaO | 04-006-5940 |
| Periclase | MgO | 04-007-3846 |
| Gypsum | $Ca(SO_4)(H_2O)_2$ | 04-015-8267 |
| Hemihydrate/Bassanite | $Ca(SO_4)(H_2O)_{0.5}$ | 01-078-5228 |
| Anhydrite | $Ca(SO_4)$ | 04-023-8816 |
| Calcite | $CaCO_3$ | 01-086-2334 |
| Portlandite | $Ca(OH)_2$ | 04-006-9156 |
| Quartz | $SiO_2$ | 04-008-8248 |
| Arcanite | $K_2Ca_2(SO_4)_3$ | 00-020-0867 |

The composition of the anhydrous cement and the hydrated mixes, as determined by XRD, is given in Table 5. Although XRD only identifies crystalline phases, with an internal standard and Rietveld refinement, the total amorphous content can also be determined. Degree of hydration is determined as the percent decrease in the crystalline phases of the raw cement (excluding calcite and calcium hydroxide), which is approximately the same as the sum of the amorphous content, calcite, and calcium hydroxide.

TABLE 5

Crystalline phases and amorphous content of the anhydrous cement and the ordinary Portland cement (OPC) paste and the OPC/biochar paste and 7- and 28-days of hydration

| Phases | Anhydrous Cement, % | OPC paste, % (7 days) | OPC paste, % (28 days) | OPC/biochar paste, % (7 days) | OPC/biochar paste, % (28 days) |
|---|---|---|---|---|---|
| Alite | 76.99 | 10.42 | 6.16 | 22.35 | 9.36 |
| Belite | 16.91 | — | — | 5.25 | 0.27 |
| Ferrite | 3.56 | 14.01 | — | 26.42 | 6.70 |
| Aluminate | — | — | — | — | — |
| Lime | 0.30 | — | 0.44 | 0.37 | — |
| Periclase | — | — | — | — | — |
| Gypsum | — | — | — | 1.02 | 2.67% |
| Hemihydrate | 0.76 | — | — | 0.72 | 0.06% |
| Anhydrite | — | 2.97 | 0.93 | 10.10 | 0.11% |
| Calcite | 1.02 | 3.38 | 2.73 | 3.28 | 0.36% |
| Calcium hydroxide | 0.46 | 1.12 | 36.18 | 3.55 | 1.29% |
| Quartz | — | — | 0.12 | 0.38 | — |
| Arcanite | — | 9.46% | 19.61 | 2.18 | 3.39% |
| Amorphous Content | 0% | 59% | 34% | 24% | 76% |

Figure 7:
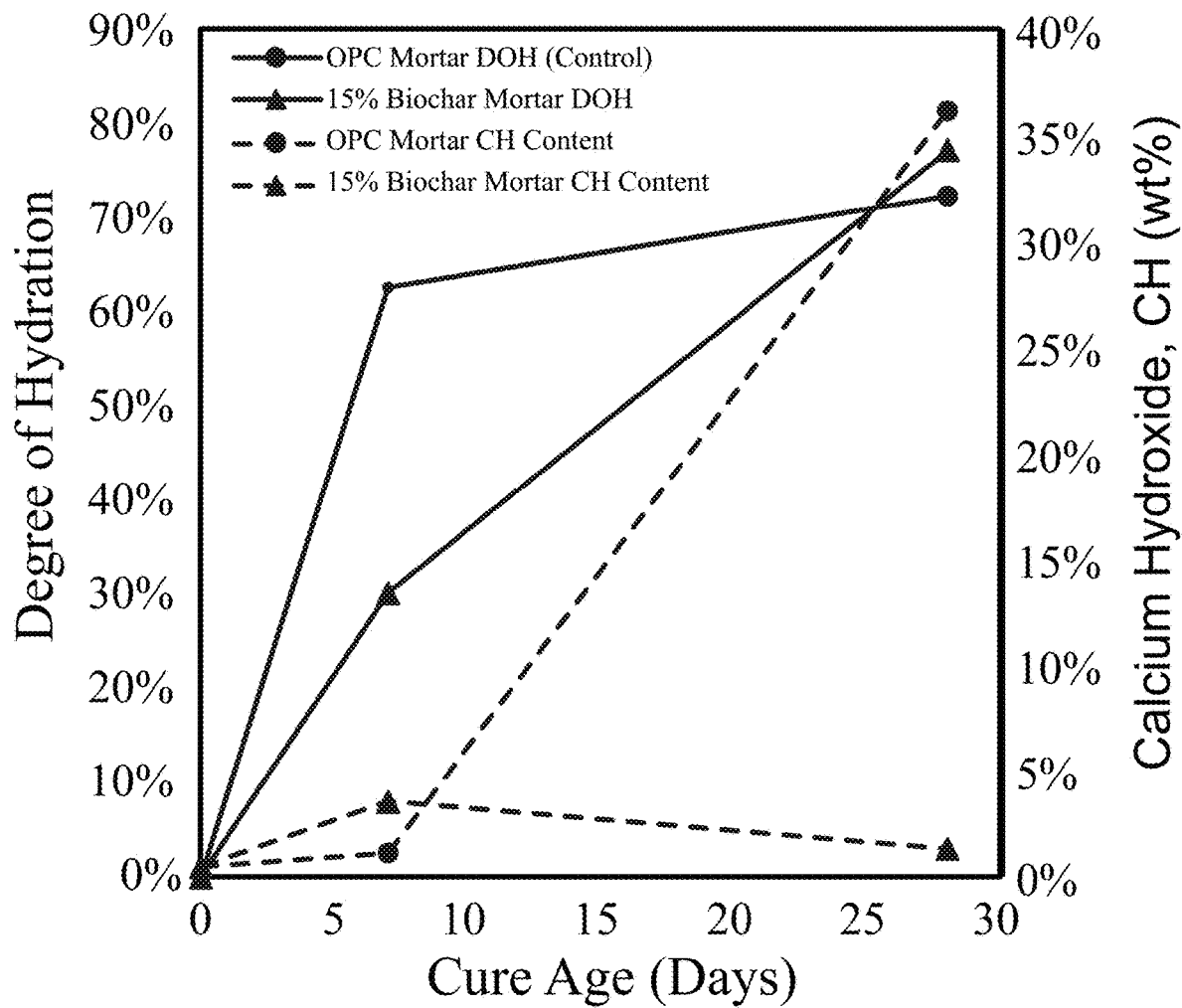
FIG. 7 illustrates a plot of the degree of hydration (solid lines) and % calcium hydroxide (dashed lines) of the 15% biochar paste (▲) compared to a control sample paste. The percentages of the biochar paste are normalized by its cement content for comparison to the control sample (●).

While the additional surface area provided by filler materials often accelerates hydration by providing increased nucleation sites, biochar also has hygroscopic properties, which initially reduces the water available for the cement hydration reaction. The biochar within the mortar samples functions as an internal curing agent, gradually releasing its water as the mix water is consumed during cement hydration reactions, resulting in a more gradual hydration reaction. At larger replacements percentages, and at early ages, it appears that water adsorption capacity of the biochar controls the hydration kinetics, offsetting any acceleration that is usually observed from non-adsorptive fillers. A comparison of the DOH of 15% biochar paste with the control paste indicates that at 7-days cure time (i.e., 7-days of hydration), the DOH of the biochar mix is less than half that of the control (see FIG. 7), despite having increased compressive strength compared to the control (see FIG. 2). While the DOH of the 15% biochar paste does surpass that of the control at 28 days cure time, collectively the 7-day cure time mortar strength and DOH data indicate that there must be additional mechanisms responsible for the strength gains in the biochar mortars, particularly at early ages.

The most probable mechanism for the strength improvement at early ages (7-days cure time) is that the biochar particles act as nucleation sites, uniformly dispersing hydration products. Thus, even though the degree of hydration of the biochar mortars is less than the degree of hydration of the control mortar at early ages, the homogeneous distribution of the cement hydration products more than compensates for the decreased volume of hydration products. Since macroscopic properties like strength are controlled by microstructural extremes (e.g., a localized defect), a more homogeneous cement matrix would be expected to lead to increased strength, thus explaining the improved strength of the biochar mortars at ages in which the degree of hydration is still less than the control. A more homogeneous cement matrix also results in a finer pore size distribution pore refinement observed in the biochar mortars (Table 3) supports this interpretation.

Example 7: Compressive Strength of 10% Biochar Mortar Sample

Although the biochar's function as an internal curing agent would also be expected to improve strength via densification of the cement matrix, this alone cannot account for the observed strength increases seen in Example 2. To verify that this is the case, the compressive strength of the 10% biochar mortar sample (measured in Example 2) was compared to control mortar samples having a w/c of 0.4 (also measured in Example 2) and 0.39. The control mortar sample having a w/c of 0.39 was investigated since biochar can adsorb 8 wt % water, making the effective w/c of the 10% biochar is 0.39 The absorbed water in biochar, does not bond chemically with carbon so that the absorbed water would be released during the hydration procedure.

The compressive strength results are illustrated in FIG. 8. Both the 7-day and 28-day compressive strength of the 10% biochar mortar sample was notably higher than that of both of the control samples. This indicates that internal curing effect only accounts for a small part of the total compressive strength gains in biochar mortars and therefore other phenomena must be involved.

Example 8: SEM Imaging of 10% Biochar Mortar Sample

Since flexural strength is more severely impacted by interfacial weaknesses than compressive strength, the decrease in flexural strength from 7 to 28 days cure time, without an accompanying decrease in compressive strength, suggests an age-dependent decrease in the bond strength between the cement matrix and the biochar. To investigate this phenomenon, scanning electron microscopy (SEM) coupled with energy dispersive X-ray spectroscopy (EDS) images were collected for the 10% biochar mortar sample in Example 2. Small cylinders were made with the control and 10% biochar mortars and cured for 28 days. Internal sections (~1×1×0.5 inch) were cut from the cylinders and the top surface was hand polished using diamond pads, up to 3000 grit. The polished surface was sputter coated in iridium to improve electrical conduction. SEM scans were run in conjunction with spot EDS scanning to verify the features present in the images.

Scanning electron micrographs of 10% biochar mortar samples are illustrated in FIG. 9. The black particles are biochar. While most of the biochar appears to be well integrated into the cement matrix, some show delamination.

For example, top SEM image shows delamination or breakage around the biochar particles. The bottom SEM image shows biochar particles that are well integrated into the cement matrix. While interfacial defects would close in compression, they would flex during flexing. This flexing could explain the observed decrease in flexural strength between 7 and 28 days, without the corresponding decrease in compressive strength.

Example 9: Impact of Mortar Composition

The impact of the various components on the compressive strength of the biochar mortar samples was investigated. Several 10% biochar mortar samples were prepared according to the method described in Example 2, except that the composition was modified as specified in Table 6. Sample A and B are the 10% biochar mortar and the control mortar samples of Example 2. In sample C (unmilled), the biochar that was incorporated into the sample was not milled thus the microporosity of the char is retained. In sample D (low SP) the amount of super plasticizer that was included in the mixture is the same as that used in the control sample, rather than increasing the amount superplasticizer so that the flow of the mixture is the same as the control as was done in Sample A. In sample E (w/c+c) the water to cement ratio plus biochar was 0.4. In this case the biochar was treated as part of the cementitious material, effectively increasing the water to cement ratio.

TABLE 6

Compositions of mortar samples.

| Mix Name | Water/Cement | Cement (kg/m$^3$) | Sand (kg/m$^3$) | Water (kg/m$^3$) | Biochar (kg/m$^3$) | SP: cement |
|---|---|---|---|---|---|---|
| Sample A 10% Biochar | 0.40 | 617.3 | 1375.7 | 245.3 | 70.2 | 1.1% |
| Sample B Control | 0.40 | 646.5 | 1440.8 | 258.6 | 0 | 0.3% |
| Sample C (unmilled) | 0.40 | 617.3 | 1375.7 | 245.3 | 70.2 | 1.1% |
| Sample D (Low SP) | 0.40 | 617.3 | 1375.7 | 245.3 | 70.2 | 0.3% |
| Sample E (w/c + c) | 0.45 | 617.3 | 1375.7 | 245.3 | 70.2 | 1.1% |

The 28-day compressive strength is illustrated in FIG. 10. The results show that that neglecting even one critical factor of the composition will result in a significant decreases in strength. The most critical component of the mixture is to ensure that the flow of the sample is maintained. Since flow affects compaction, mixes with decreased flow will have significant decreases in strength, even if all other variables are constrained.

Example 10: Impact of Higher Biochar Replacement Levels

To explore the effect of higher replacement levels of biochar, mortar samples comprising 20% biochar and higher were prepared and subjected to strength tests. These mortar samples are produced according to the procedure discussed in Example 2, except that in some cases higher w/c and higher amounts of superplasticizer were utilized as shown in Table 7. At these biochar percentages, it became increasingly difficult to maintain both the w/c and flow of the wet mixes. At increasingly replacement levels and a w/c of 0.4, the mix becomes thixotropic. With the shear rates typical of a stand mixer, the mixture did not flow and therefore, these samples had to be hand kneaded to mix properly. By modulating both the w/c and the superplasticizer dosage, it is possible to achieve similar workability compared to the control.

TABLE 7

Compositions of mortar samples.

| Mix Name | Water/Cement | Cement (kg/m$^3$) | Sand (kg/m$^3$) | Water (kg/m$^3$) | Biochar (kg/m$^3$) | SP: cement |
|---|---|---|---|---|---|---|
| Control | 0.4 | 646.5 | 1440.8 | 258.6 | 0 | 0.3% |
| 20% Biochar | 0.4 | 584.3 | 1302.2 | 230.2 | 149.6 | 8.8% |
| 32% Biochar | 0.55 | 498.3 | 1110.5 | 268.4 | 240.1 | 12.3% |
| 32% Biochar | 0.61 | 483.9 | 1078.3 | 289.7 | 233.2 | 8.0% |

Once cured and demolded, it was impossible to test the 28-day strength of the 20% biochar mortar, because the sample dissolved; however, the 7-day strength was 63 MPa, which still exceeds the strength of the control at the same age. The dissolution appears to be the result of the excessive superplasticizer required to maintain the mortar flow without increasing the water to cement ratio, as opposed to a function of the char volume itself.

The mortar samples comprising 32% biochar were prepared by partially adjusting the flow by increasing the water to cement ratio. Since the biochar acts as an internal curing agent, it may be possible to tune the flow properties with an optimal blend of increased water and superplasticizer without decreasing the strength compared to the control. For instance, two 32% biochar mixes are illustrated in FIG. 11. The 32% biochar sample having a w/c of 0.55 has the same w/c as the control sample and the flow was adjusted with superplasticizer to match the flow of control. This results in a 16% decrease in 28-day compressive strength compared to the control mix. In contrast, the 32% biochar sample having a w/c of 0.61 has the same superplasticizer dosage used in the control sample and adjusts the flow with water to match the flow of the control. This results in only a 7% decrease in 29-day compressive strength compared to the control sample. While the 32% biochar mortar samples had a decreased 28-day compressive strength compared to the control, given the pozzolanic nature of the char it is possible that the strength of the biochar mortars will continue to improve beyond 28/29 days at a rate which exceeds the strength gains in OPC mortars, thus closing or eliminating the strength gap.

Example 11: Extension to Concrete Mixes

Concrete mixtures were made following the same procedure outlined in Example 2, except that coarse aggregate was included in the dry ingredients, all the ingredients were combined in a drum mixer, the superplasticizer content of the mixes was adjusted to obtain a target slump of 150±40 mm, and the mixtures were molded in disposable plastic cylindrical molds which did not require any lubrication. The composition of the control concrete and the 15% biochar concrete is provided in Table 8. The amount of biochar in the concrete is reported as the percent biochar based on the total amount of cement and biochar, expressed as a percent.

TABLE 8

Compositions of concrete samples.

| Mix Name | Water/<br>Cement<br>(target) | Cement<br>(kg) | Sand<br>(kg) | Water<br>(kg) | Biochar<br>(kg) | SP:<br>cement |
|---|---|---|---|---|---|---|
| Control | 0.55 | 9.8 | 22.1 | 5.4 | 0 | 0.1% |
| 15% Biochar | 0.55 | 6.3 | 14.2 | 3.4 | 1.2 | 1.6% |

Example 12: Compressive Strength Testing of Biochar Concrete Samples

Compressive strength testing was performed on 4"×8" cylinders produced from the concrete samples of Example 11, as described by ASTM C39. After 24 hours of curing in the sealed mold, the samples were transferred to a saturated limewater bath until the desired testing age (28 days) and then surface dried prior to testing. An axial force was applied to compress the cylinder at a ramp rate of 35 psi/s until the sample failed.

The results from the compressive strength test are summarized in Table 9. The 28-day compressive strength of the 15% biochar concrete was 8% higher than the 28-day compressive strength of the control sample, indicating that the biochar used in this study is also effective at increasing the strength of concrete mixtures.

TABLE 9

Compressive strength of biochar concrete

| Mix Name | Water/Cement<br>(target) | Compressive Strength<br>(MPa) |
|---|---|---|
| Control | 0.55 | 42.4 ± 1.3 |
| 15% Biochar | 0.55 | 45.8 ± 1.3 |

Example 13: Carbon Sequestration Capacity

The biochar mortar compositions disclosed herein have the potential to reduce, or even neutralize, the carbon footprint associated with concrete production. Based on conservative carbon sequestration estimates (assuming 2.2 grams $CO_2$ per gram of biochar) combined with use of less cement (assuming 1-gram $CO_2$ per gram cement), replacing cement with 10% biochar is equivalent to a 32% reduction in the carbon footprint. Replacing cement with 15% biochar is equivalent to a 48% reduction in the carbon footprint. As shown in Example 2, both the 10% and the 15% biochar mortar sample displayed a higher 28-day compressive strength compared to the control mortar sample. Replacing cement with 32% biochar provides a composition with a carbon-neutral footprint. At this level of biochar, the biochar is able to more than offset the $CO_2$ emissions associated with the cement manufacturing process These estimates are conservative and do not reflect the further carbon savings imbued by the biochar producers from the coproduction of bioenergy or biofuels which may be used to offset the use of fossil fuels.

Example 14: Exemplary Methods Embodiments

Example 14.1 is a method of preparing a cementitious composition, comprising: combining a hydraulic cement, at least 2 wt. % of a biochar based on the total amount of the hydraulic cement and the biochar, and one or more aggregate materials; and adding water in an amount sufficient to obtain a water to cement ratio (w/c) of 0.3 to 0.65 to form a wet mixture; wherein the biochar is in the form of particles having a mean particle size ($D_{v,50}$) of 0.1 μm-100 μm and an average surface area of at least 20 $m^2$/g.

Example 14.2 is the method of example 14.1, further comprising: pouring the composition into a mold; and curing the composition to form a cementitious structure.

Example 14.3 is the method of example 14.1 or example 14.2, wherein at least 7 wt. % biochar, based on the total amount of the hydraulic cement and the biochar, is combined with the with the hydraulic cement and the one or more aggregate materials.

Example 14.4 is the method of example 14.1 or example 14.2, wherein at least 10 wt. % biochar, based on the total amount of the hydraulic cement and the biochar, is combined with the with the hydraulic cement and the one or more aggregate materials.

Example 14.5 is the method of example 14.1 or example 14.2, wherein at least 15 wt. % biochar, based on the total amount of the hydraulic cement and the biochar, is combined with the with the hydraulic cement and the one or more aggregate materials.

Example 14.6 is the method of example 14.1 or example 14.2, wherein at least 20 wt. % biochar, based on the total amount of the hydraulic cement and the biochar, is combined with the with the hydraulic cement and the one or more aggregate materials.

Example 14.7 is the method of example 14.1 or example 14.2, wherein at least 25 wt. % biochar, based on the total amount of the hydraulic cement and the biochar, is combined with the with the hydraulic cement and the one or more aggregate materials.

Example 14.8 is the method of example 14.1 or example 14.2, wherein at least 30 wt. % biochar, based on the total amount of the hydraulic cement and the biochar, is combined with the with the hydraulic cement and the one or more aggregate materials.

Example 14.9 is the method of any one of examples 14.1 to 14.8, wherein the biochar is in the form of particles having a mean particle size ($D_{v,50}$) of 0.1 μm-100 μm.

Example 14.10 is the method of any one of examples 14.1 to 14.8, wherein the biochar is in the form of particles having a mean particle size ($D_{v,50}$) of 1 μm-30 μm.

Example 14.11 is the method of any one of examples 14.1 to 14.8, wherein the biochar is in the form of particles having a mean particle size ($D_{v,50}$) of 1 μm-20 μm.

Example 14.12 is the method of any one of examples 14.1 to 14.8, wherein, the biochar is in the form of particles having a mean particle size ($D_{v,50}$) of 5 μm-20 μm.

Example 14.13 is the method of any one of examples 14.1 to 14.12, wherein the biochar has an average surface area of at least 100 $m^2$/g.

Example 14.14 is the method of any one of examples 14.1 to 14.12, wherein the biochar has an average surface area of at least 200 $m^2$/g.

Example 14.15 is the method of any one of examples 14.1 to 14.14, wherein the biochar has a water holding capacity of at least 3% to no more than 15%, based on the weight of the biochar.

Example 14.16 is the method of any one of examples 14.1 to 14.14, wherein the biochar has a water holding capacity of at least 5% to no more than 10%, based on the weight of the biochar.

Example 14.17 is the method of any one of examples 14.1 to 14.16, wherein the biochar has an ash content of at least 2% to no more than 60%, based on the weight of the biochar.

Example 14.18 is the method of any one of examples 14.1 to 14.14, wherein the biochar has an ash content of at least 2% to no more than 30%, based on the weight of the biochar.

Example 14.19 is the method of any one of examples 14.1 to 14.14, wherein the biochar has an ash content of at least 2% to no more than 15%, based on the weight of the biochar.

Example 14.20 is the method of any one of examples 14.1 to 14.19, wherein the biochar has a pozzolanic activity is at least 50% of the class F fly ash.

Example 14.21 is the method of any one of examples 14.1 to 14.19, wherein the biochar has a pozzolanic activity is at least 60% of the class F fly ash.

Example 14.22 is the method any one of examples 14.1 to 14.8, wherein the biochar is in the form of particles having a mean particle size ($D_{v,50}$) of 0.1 μm-30 μm and an average surface area of at least 200 m$^2$/g, a water holding capacity of at least 3% based on the weight of the biochar, and an ash content of at least 2% to no more than 30% based on the weight of the biochar.

Example 14.23 is the method of any one of examples 14.1 to 14.22, wherein the biochar is derived from fast pyrolysis.

Example 14.24 is the method of any one of examples 14.1 to 14.23, wherein the biochar is derived from a woody biomass material.

Example 14.25 is the method of any one of examples 14.1 to 14.24, wherein the biochar is derived from a biomass material selected from the group consisting of pine, poplar, and combinations thereof.

Example 14.26 is the method of any one of examples 14.1 to 14.25, wherein the hydraulic cement comprises a Portland cement and/or a non-Portland cement.

Example 14.27 is the method of examples 14.26, wherein the hydraulic cement comprises a Portland cement selected from the group consisting of Ordinary Portland Cement, type I, type II, and combinations thereof.

Example 14.28 is the method of examples 14.26, wherein the hydraulic cement comprises a Portland cement per ASTM C150.

Example 14.29 is the method of examples 14.26, wherein the hydraulic cement comprises a non-Portland cement selected from the group consisting of alkali-activated slag cement, pozzolan-lime cements, slag-lime-cements, super-sulfated cements, calcium aluminate cements, calcium sulfoaluminate cements, and combinations thereof.

Example 14.30 is the method of any one of examples 14.1 to 14.29, wherein the one or more aggregate materials comprise a fine aggregate.

Example 14.31 is the method of any one of examples 14.1 to 14.30, wherein the one or more aggregate materials comprise a coarse aggregate.

Example 14.32 is the method of any one of examples 14.1 to 14.31, wherein the one or more aggregate materials are selected from the group consisting of crushed rock, sand, gravel, recycled concrete, and combinations thereof.

Example 14.33 is the method of any one of examples 14.1 to 14.32, wherein an amount of the one or more aggregate materials is at least 40% and no more than 95% by weight based on the weight of the dry ingredients.

Example 14.34 is the method of any one of examples 14.1 to 14.33, wherein an amount of the one or more aggregate materials is at least 60% and no more than 85% by weight based on the weight of the dry ingredients.

Example 14.35 is the method of any one of examples 14.1 to 14.34, wherein the w/c ratio is at least 0.35 to no more than 0.6.

Example 14.36 is the method of any one of examples 14.1 to 14.35, wherein the w/c ratio is at least 0.35 to no more than 0.45.

Example 14.37 is the method of any one of examples 14.1 to 14.36, wherein the w/c ratio is at least 0.35 to no more than 0.45.

Example 14.38 is the method of any one of examples 14.1 to 14.37, further comprising adding a superplasticizer to the wet mixture.

Example 14.39 is the method of example 14.38, wherein the super plasticizer is added to the wet mixture in an amount of between 0.5% and 15% by weight based on the weight of the cement.

Example 14.40 is the method of example 14.38 or example 14.39, wherein the superplasticizer is selected from the group consisting of: sulfonated melamine formaldehyde, a sulfonated naphthalene formaldehyde condensate, an acetone sulfonate formaldehyde condensate, a sulfamate formaldehyde condensate, a lignosulfonate, a polycarboxylate, and combinations thereof.

Example 14.41 is the method of any one of examples 14.38 to 14.40, wherein the superplasticizer is selected from the group consisting of polyethylene glycol (MPEG), allyloxy polyethylene glycol (APEG), tresylated polyethylene glycol (TPEG), isobutylene alcohol polyoxyethylene ether (HPEG), ViscoCrete®, and combinations thereof.

Example 14.42 is the method of any one of examples 14.1 to 14.41, wherein the wet mixture has a slump of between 0 mm to 250 mm.

Example 14.43 is the method of any one of examples 14.1 to 14.41, wherein the wet mixture has a slump of between 50 mm to 200 mm.

Example 14.44 is the method of any one of examples 14.1 to 14.41, wherein the wet mixture has a slump of between 100 mm to 150 mm.

Example 14.45 is the method of any one of examples 14.1 to 14.44, further comprising adding one or more additives selected from the group consisting of accelerators, air detrainers, air entrainers, binders, coloring agents, corrosion inhibitors, light-weighting additives, pumping aids, retarder, shrink reducers, water reducers, pozzolans, slag, and combinations thereof.

Example 15: Exemplary Composition Embodiments

Example 15.1 is a cementitious stricture, comprising: a hydraulic cement; at least 2% of a particulate biochar by weight based on a total amount of hydraulic cement and biochar, wherein the particulate biochar comprises a mean particle size ($D_{v,50}$) of 0.1 μm-100 μm and an average surface area of at least 20 m$^2$/g; and one or more aggregate materials; wherein: the biochar and the one or more aggregate materials are dispersed within the hydraulic cement.

Example 15.2 is of a cementitious composition, comprising: a hydraulic cement; at least 2% of a particulate biochar by weight based on a total amount of hydraulic cement and biochar, wherein the particulate biochar comprises a mean particle size ($D_{v,50}$) of 0.1 μm-100 μm and an average surface area of at least 100 m$^2$/g; and one or more aggregate materials.

Example 15.3 is the composition of example 15.1 or example 15.2, wherein at least 7 wt. % biochar, based on the total amount of the hydraulic cement and the biochar, is combined with the with the hydraulic cement and the one or more aggregate materials.

Example 15.4 is the composition of example 15.1 or example 15.2, wherein at least 10 wt. % biochar, based on the total amount of the hydraulic cement and the biochar, is combined with the with the hydraulic cement and the one or more aggregate materials.

Example 15.5 is the composition of example 15.1 or example 15.2, wherein at least 15 wt. % biochar, based on the total amount of the hydraulic cement and the biochar, is combined with the with the hydraulic cement and the one or more aggregate materials.

Example 15.6 is the composition of example 15.1 or example 15.2, wherein at least 20 wt. % biochar, based on the total amount of the hydraulic cement and the biochar, is combined with the with the hydraulic cement and the one or more aggregate materials.

Example 15.7 is the composition of example 15.1 or example 15.2, wherein at least 25 wt. % biochar, based on the total amount of the hydraulic cement and the biochar, is combined with the with the hydraulic cement and the one or more aggregate materials.

Example 15.8 is the composition of example 15.1 or example 15.2, wherein at least 30 wt. % biochar, based on the total amount of the hydraulic cement and the biochar, is combined with the with the hydraulic cement and the one or more aggregate materials.

Example 15.9 is the composition of any one of examples 15.1 to 15.8, wherein the biochar is in the form of particles having a mean particle size ($D_{v,50}$) of 0.1 μm-100 μm.

Example 15.10 is the composition of any one of examples 15.1 to 15.8, wherein the biochar is in the form of particles having a mean particle size ($D_{v,50}$) of 1 μm-30 μm.

Example 15.11 is the composition of any one of examples 15.1 to 15.8, wherein the biochar is in the form of particles having a mean particle size ($D_{v,50}$) of 1 μm-20 μm.

Example 15.12 is the composition of any one of examples 15.1 to 15.8, wherein, the biochar is in the form of particles having a mean particle size ($D_{v,50}$) of 5 μm-20 μm.

Example 15.13 is the composition of any one of examples 15.1 to 15.12, wherein the biochar has an average surface area of at least 100 $m^2/g$.

Example 15.14 is the composition of any one of examples 15.1 to 15.12, wherein the biochar has an average surface area of at least 200 $m^2/g$.

Example 15.15 is the composition of any one of examples 15.1 to 15.14, wherein the biochar has a water holding capacity of at least 3% to no more than 5%, based on the weight of the biochar.

Example 15.16 is the composition of any one of examples 15.1 to 15.14, wherein the biochar has a water holding capacity of at least 5% to no more than 10%, based on the weight of the biochar.

Example 15.17 is the composition of any one of examples 15.1 to 15.14, wherein the biochar has an ash content of at least 2% to no more than 60%, based on the weight of the biochar.

Example 15.18 is the composition of any one of examples 15.1 to 15.14, wherein the biochar has an ash content of at least 2% to no more than 30%, based on the weight of the biochar.

Example 15.19 is the composition of any one of examples 15.1 to 15.14, wherein the biochar has an ash content of at least 2% to no more than 15%, based on the weight of the biochar.

Example 15.20 is the composition of any one of examples 15.1 to 15.19, wherein the biochar has a pozzolanic activity is at least 50% of the class F fly ash.

Example 15.21 is the composition of any one of examples 15.1 to 15.19, wherein the biochar has a pozzolanic activity is at least 60% of the class F fly ash.

Example 15.22 is the composition any one of examples 15.1 to 15.8, wherein the biochar is in the form of particles having a mean particle size ($D_{v,50}$) of 0.1 μm-30 μm and an average surface area of at least 200 $m^2/g$, a water holding capacity of at least 3% based on the weight of the biochar, and an ash content of at least 2% to no more than 30% based on the weight of the biochar.

Example 15.23 is the composition of any one of examples 15.1 to 15.22, wherein the biochar is derived from fast pyrolysis.

Example 15.24 is the composition of any one of examples 15.1 to 15.23, wherein the biochar is derived from a woody biomass material.

Example 15.25 is the composition of any one of examples 15.1 to 15.24, wherein the biochar is derived from a biomass material selected from the group consisting of pine, poplar, and combinations thereof.

Example 15.26 is the composition of any one of examples 15.1 to 15.25, wherein the hydraulic cement comprises a Portland cement and/or a non-Portland cement.

Example 15.27 is the composition of examples 15.26, wherein the hydraulic cement comprises a Portland cement selected from the group consisting of Ordinary Portland Cement, type I, type II, and combinations thereof.

Example 15.28 is the composition of examples 15.26, wherein the hydraulic cement comprises a Portland cement per ASTM C150.

Example 15.29 is the composition of examples 15.26, wherein the hydraulic cement comprises a non-Portland cement selected from the group consisting of alkali-activated slag cement, pozzolan-lime cements, slag-lime-cements, supersulfated cements, calcium aluminate cements, calcium sulfoaluminate cements, and combinations thereof.

Example 15.30 is the composition of any one of examples 15.1 to 15.29, wherein the one or more aggregate materials comprise a fine aggregate.

Example 15.31 is the composition of any one of examples 15.1 to 15.30, wherein the one or more aggregate materials comprise a coarse aggregate.

Example 15.32 is the composition of any one of examples 15.1 to 15.31, wherein the one or more aggregate materials are selected from the group consisting of crushed rock, sand, gravel, recycled concrete, and combinations thereof.

Example 15.33 is the composition of any one of examples 15.1 to 15.32, wherein an amount of the one or more aggregate materials is at least 40% and no more than 95% by weight based on the weight of the dry ingredients.

Example 15.34 is the composition of any one of examples 15.1 to 15.32, wherein an amount of the one or more aggregate materials is at least a 60% and no more than 85% by weight based on the weight of the dry ingredients.

Example 15.35 is the composition of any one of examples 15.1 to 15.34, wherein the composition further comprising a superplasticizer.

Example 15.36 is the composition of example 15.35, wherein an amount of the super plasticizer is between 0.5% and 15% by weight based on the weight of the cement.

Example 15.37 is the composition of example 15.35 or example 15.36, wherein the superplasticizer is selected from the group consisting of: sulfonated melamine formaldehyde, a sulfonated naphthalene formaldehyde condensate, an acetone sulfonate formaldehyde condensate, a sulfamate formaldehyde condensate, a lignosulfonate, a polycarboxylate, and combinations thereof.

Example 15.38 is the composition of any one of examples 15.35 to 15.37, wherein the superplasticizer is selected from the group consisting of polyethylene glycol (MPEG), allyloxy polyethylene glycol (APEG), tresylated polyethylene glycol (TPEG), isobutylene alcohol polyoxyethylene ether (HPEG), ViscoCrete®, and combinations thereof.

Example 15.39 is the composition of any one of examples 15.1 to 15.38, wherein the composition further comprises one or more additives selected from the group consisting of accelerators, air detrainers, air entrainers, binders, coloring agents, corrosion inhibitors, light-weighting additives, pumping aids, retarder, shrink reducers, water reducers, pozzolans, slag, and combinations thereof.

Example 15.40 is the composition of any one of examples 15.1 and examples 15.3 to 15.39, wherein the cementitious structure has a compressive strength of at least 5 MPa.

Example 15.41 is the composition of any one of examples 15.1 and examples 15.3 to 15.39, wherein the cementitious structure has a compressive strength of at least 20 MPa.

Example 15.42 is the composition of any one of examples 15.1 and examples 15.3 to 15.39, wherein the cementitious structure has a compressive strength of at least 40 MPa.

Example 15.43 is the composition of any one of examples 15.2 to 15.39, wherein the composition further comprises water.

Example 15.44 is the composition of example 15.43, wherein a water to cement ratio is at least 0.35 to no more than 0.6.

Example 15.45 is the composition of example 15.43, wherein a water to cement ratio is at least 0.35 to no more than 0.45.

Example 15.46 is the composition of example 15.43, wherein a water to cement is at least 0.35 to no more than 0.45.

Example 15.47 is the composition of any one of examples 15.43 to 15.46, wherein the composition has a slump of between 0 mm to 250 mm.

Example 15.48 is the composition of any one of examples 15.43 to 15.46, wherein the composition has a slump of between 50 mm to 200 mm.

Example 15.49 is the composition of any one of examples 15.43 to 15.46, wherein the composition has a slump of between 100 mm to 150 mm.

Various modifications of the above described invention will be evident to those skilled in the art. It is intended that such modifications are included within the scope of the following claims.

What is claimed is:

1. A cementitious solid, comprising:
a hydraulic cement;
between 4.5% and 30% of a biochar by weight based on a total amount of the hydraulic cement and the biochar; and
between 60% and 85% of an aggregate material by weight based on the hydraulic cement, the biochar, and the aggregate material; wherein:
the biochar comprises an ash content between 3 wt % and 30 wt % based on the weight of the biochar,
the biochar has a mean particle size ($D_{v,50}$) between 0.1 µm and 3.0 µm,
the biochar and the aggregate material are dispersed within the hydraulic cement, and
the cementitious solid has a compressive strength between 50 MPa and 90 MPa.

2. The cementitious solid of claim 1, wherein the biochar comprises an ash content between 3 wt % and 15 wt % based on the weight of the biochar.

3. The cementitious solid of claim 2, wherein the $D_{v,50}$ is between 1 µm and 3.0 µm.

4. The cementitious solid of claim 3, wherein the biochar has an average surface area between 2 m²/g and 20 m²/g.

5. The cementitious solid of claim 4, wherein the biochar comprises a water holding capacity between 3 wt % and 15 wt % based on the weight of the biochar.

6. The cementitious solid of claim 5, wherein the cementitious solid has a flexural strength between 4 MPa and 10 MPa.

7. The cementitious solid of claim 1, wherein the hydraulic cement is a Portland cement.

8. The cementitious solid of claim 7, wherein the Portland cement is ASTM C150 Standard Portland Cement.

9. The cementitious solid of claim 1, wherein the aggregate material comprises sand.

10. The cementitious solid of claim 9, wherein the aggregate material further comprises crushed rock, gravel, recycled concrete, or combinations thereof.

11. The cementitious solid of claim 1, further comprising a superplasticizer.

12. The cementitious solid of claim 11, wherein the superplasticizer comprises sulfonated melamine formaldehyde, a sulfonated naphthalene formaldehyde condensate, an acetone sulfonate formaldehyde condensate, a sulfamate formaldehyde condensate, a lignosulfonate, a polycarboxylate, or combinations thereof.

13. The cementitious solid of claim 1, wherein the biochar is further characterized by a total pore volume between 0.003 cc/g and 3 cc/g.

14. The cementitious solid of claim 1, whereupon the addition of water, the cementitious solid is further characterized by a capillary pore volume between 0.024 cm³/g and 0.041 cm³/g.

15. A cementitious mixture, comprising:
a hydraulic cement;
between 4.5% and 30% of a biochar by weight based on a total amount of the hydraulic cement and the biochar;
between 60% and 85% of an aggregate material by weight based on the hydraulic cement, the biochar, and the aggregate material; and
water, wherein:
the biochar comprises an ash content between 3 wt % and 30 wt % based on the weight of the biochar,
the biochar comprises a mean particle size ($D_{v,50}$) of between 0.1 µm and 3.0 µm,
the biochar and the aggregate material are dispersed within the hydraulic cement,
the cementitious mixture has a water to hydraulic cement ratio between 0.3 and 0.65,
the cementitious mixture has a slump between 100 mm and 150 mm, and
the cementitious mixture is capable of curing into a cementitious solid having a compressive strength between 50 MPa and 90 MPa.

16. A method of preparing a cementitious solid, comprising:
producing a biochar by fast pyrolysis; and
forming a cementitious mixture by combining a hydraulic cement, an aggregate material, and the biochar;
adding water to obtain a water to hydraulic cement ratio between 0.3 and 0.65; and mixing the cementitious mixture such that the biochar and the aggregate material are dispersed within the hydraulic cement resulting in a slump between 100 mm and 150 mm, wherein:

the cementitious mixture contains between 4.5% and 30% of the biochar by weight based on a total amount of the hydraulic cement and the biochar;

the cementitious mixture contains between 60% and 85% material by weight based on the hydraulic cement, the biochar, and the gate material;

the biochar comprises an ash content between 3 wt % and 30 wt % based on the weight of the biochar, the biochar has a mean particle size ($D_{v,50}$) between 0.1 μm and 3.0 μm, and the cementitious mixture is capable of curing into the cementitious solid having a compressive strength between 50 MPa and 90 MPa.

17. The method of claim 16, further comprising:

pouring the cementitious mixture into a mold; and curing the composition to form the cementitious solid.

* * * * *